US009927873B2

(12) United States Patent
Cruz-Hernandez et al.

(10) Patent No.: US 9,927,873 B2
(45) Date of Patent: Mar. 27, 2018

(54) SYSTEMS AND METHODS FOR USING TEXTURES IN GRAPHICAL USER INTERFACE WIDGETS

(75) Inventors: Juan Manuel Cruz-Hernandez, Montreal (CA); Danny A Grant, Laval (CA); Ali Modarres, Montreal (CA); Andrew Gosline, Montreal (CA)

(73) Assignee: Immersion Corporation, San Jose, CA (US)

( * ) Notice: Subject to any disclaimer, the term of this patent is extended or adjusted under 35 U.S.C. 154(b) by 165 days.

(21) Appl. No.: 12/697,037

(22) Filed: Jan. 29, 2010

(65) Prior Publication Data
US 2010/0231541 A1  Sep. 16, 2010

Related U.S. Application Data

(60) Provisional application No. 61/159,482, filed on Mar. 12, 2009, provisional application No. 61/262,041, (Continued)

(51) Int. Cl.
G08B 6/00 (2006.01)
G06F 3/01 (2006.01)
G06F 3/0488 (2013.01)

(52) U.S. Cl.
CPC .............. *G06F 3/016* (2013.01); *G06F 3/017* (2013.01); *G06F 3/0488* (2013.01); *G06F 2203/014* (2013.01); *G08B 6/00* (2013.01)

(58) Field of Classification Search
None
See application file for complete search history.

(56) References Cited

U.S. PATENT DOCUMENTS 5,144,187 A   9/1992 Culp
5,198,732 A   3/1993 Morimoto
(Continued)

FOREIGN PATENT DOCUMENTS

CN   1646833     7/2005
EP   0899 650    3/1999
(Continued)

OTHER PUBLICATIONS

Biet, M. et al., "Discrimination of Virtual Square Gratings by Dynamic Touch on Friction Based Tactile Displays," Haptic Interfaces for Virtual Environment and Teleoperator Systems, 2008, Symposium, IEEE, Piscataway, NJ, XP 031339918, pp. 41-48, Mar. 2008.

(Continued)

*Primary Examiner* — Brian Zimmerman
*Assistant Examiner* — Kevin Lau
(74) *Attorney, Agent, or Firm* — Kilpatrick Townsend & Stockton LLP

(57) ABSTRACT

Systems and methods for using textures in graphical user interface widgets are disclosed. For example, one disclosed system includes: a system including: an actuator configured to receive a haptic signal and output a haptic effect based at least in part on the haptic signal, the haptic effect configured to simulate a texture; a touch-sensitive interface configured to detect a user interaction and output a interface signal; and a processor in communication with the actuator and the touch-sensitive interface, the processor configured to: receive the interface signal; receive a display signal including a plurality of pixels defining a display area; determine a first texture associated with a first group of pixels defining a first section of the display area; determine a second texture associated with a second group of pixels defining a second section of the display area; and transmit a haptic signal (Continued)

configured to cause the actuator to: output a first haptic effect configured to simulate the first texture if the user interaction is associated with the first section of the display area, and output a second haptic effect configured to simulate the second texture if the user interaction is associated with the second section of the display area.

23 Claims, 13 Drawing Sheets

Related U.S. Application Data filed on Nov. 17, 2009, provisional application No. 61/262,038, filed on Nov. 17, 2009.

(56) References Cited

U.S. PATENT DOCUMENTS

| | | | |
|---|---|---|---|
| 5,691,898 A | 11/1997 | Rosenberg et al. | |
| 5,709,219 A | 1/1998 | Chen et al. | |
| 5,734,373 A | 3/1998 | Rosenberg et al. | |
| 5,767,839 A | 6/1998 | Rosenberg | |
| 5,844,392 A | 12/1998 | Peurach et al. | |
| 5,952,806 A | 9/1999 | Muramatsu | |
| 5,956,484 A | 9/1999 | Rosenberg et al. | |
| 5,959,613 A | 9/1999 | Rosenberg et al. | |
| 6,285,351 B1 | 9/1999 | Rosenberg et al. | |
| 6,028,593 A | 2/2000 | Rosenberg et al. | |
| 6,046,527 A | 4/2000 | Roopnarine et al. | |
| 6,084,587 A | 7/2000 | Tarr et al. | |
| 6,088,019 A | 7/2000 | Rosenberg | |
| 6,131,097 A | 10/2000 | Peurach et al. | |
| 6,147,674 A | 11/2000 | Rosenberg et al. | |
| 6,169,540 B1 | 1/2001 | Rosenberg et al. | |
| 6,219,032 B1 | 4/2001 | Rosenberg | |
| 6,252,579 B1 | 6/2001 | Rosenberg | |
| 6,292,170 B1 | 9/2001 | Chang et al. | |
| 6,433,711 B1 | 3/2002 | Chen | |
| 6,429,846 B2 | 8/2002 | Rosenberg et al. | |
| 6,697,086 B2 | 2/2004 | Rosenberg et al. | |
| 6,703,924 B2 | 3/2004 | Tecu et al. | |
| 6,850,222 B1 | 2/2005 | Rosenberg | |
| 6,859,819 B1 | 2/2005 | Rosenberg et al. | |
| 7,027,032 B2 | 4/2006 | Rosenberg et al. | |
| 7,109,967 B2 | 9/2006 | Hioki et al. | |
| 7,148,875 B2 | 12/2006 | Rosenberg et al. | |
| 7,812,828 B2 | 10/2010 | Westerman et al. | |
| 7,815,436 B2 | 10/2010 | Cunningham et al. | |
| 7,920,124 B2 | 4/2011 | Tokita et al. | |
| 8,210,942 B2 | 7/2012 | Shimabukuro et al. | |
| 8,264,465 B2 | 9/2012 | Grant et al. | |
| 8,494,860 B2 | 7/2013 | Asakawa et al. | |
| 8,677,274 B2 | 3/2014 | Runov et al. | |
| 2001/0035854 A1 | 11/2001 | Rosenberg et al. | |
| 2002/0177471 A1 | 11/2002 | Kaaresoja et al. | |
| 2003/0063128 A1 | 4/2003 | Salminaa et al. | |
| 2003/0117490 A1 | 6/2003 | Tecu et al. | |
| 2003/0184518 A1 | 10/2003 | Numata et al. | |
| 2004/0169674 A1 | 9/2004 | Linjama | |
| 2004/0218910 A1* | 11/2004 | Chang et al. | 386/98 |
| 2004/0233162 A1 | 11/2004 | Kobayashi | |
| 2005/0017947 A1* | 1/2005 | Shahoian et al. | 345/156 |
| 2005/0030292 A1 | 2/2005 | Diederiks | |
| 2005/0057528 A1 | 3/2005 | Kleen | |
| 2006/0024647 A1 | 2/2006 | Chesnais et al. | |
| 2006/0046031 A1 | 3/2006 | Janevski | |
| 2006/0061545 A1 | 3/2006 | Hughes et al. | |
| 2006/0061558 A1 | 3/2006 | Grant et al. | |
| 2006/0119573 A1 | 6/2006 | Grant et al. | |
| 2006/0119586 A1 | 6/2006 | Grant et al. | |
| 2006/0181510 A1 | 8/2006 | Faith | |
| 2006/0209037 A1 | 9/2006 | Wang et al. | |
| 2006/0226298 A1 | 10/2006 | Pierson | |
| 2006/0267416 A1 | 11/2006 | Suzuki | |
| 2006/0290662 A1 | 12/2006 | Houston et al. | |
| 2007/0021961 A1 | 1/2007 | Oh | |
| 2007/0066283 A1 | 3/2007 | Haar et al. | |
| 2007/0236450 A1 | 10/2007 | Colgate et al. | |
| 2007/0236474 A1 | 10/2007 | Ramstein | |
| 2007/0279401 A1 | 12/2007 | Ramstein et al. | |
| 2007/0290988 A1 | 12/2007 | Nogami et al. | |
| 2008/0048974 A1 | 2/2008 | Braun et al. | |
| 2008/0068348 A1 | 3/2008 | Rosenberg et al. | |
| 2008/0068648 A1 | 3/2008 | Benz et al. | |
| 2008/0216578 A1 | 9/2008 | Takashima et al. | |
| 2009/0102805 A1 | 4/2009 | Meijer et al. | |
| 2009/0134744 A1 | 5/2009 | Yoon et al. | |
| 2009/0207129 A1 | 8/2009 | Ullrich et al. | |
| 2009/0227296 A1 | 9/2009 | Kim | |
| 2009/0284485 A1 | 11/2009 | Colgate et al. | |
| 2010/0020036 A1 | 1/2010 | Hui et al. | |
| 2010/0026976 A1 | 2/2010 | Meehan et al. | |
| 2010/0073304 A1 | 3/2010 | Grant et al. | |
| 2010/0108408 A1 | 5/2010 | Colgate et al. | |
| 2010/0231539 A1 | 9/2010 | Cruz-Hernandez et al. | |
| 2010/0315212 A1* | 12/2010 | Radivojevic | G06F 3/016 340/407.2 |
| 2011/0115709 A1 | 5/2011 | Cruz-Hernandez | |
| 2011/0248817 A1* | 10/2011 | Houston | A63F 13/06 340/4.2 |
| 2012/0232780 A1 | 9/2012 | Delson | |

FOREIGN PATENT DOCUMENTS

| | | |
|---|---|---|
| EP | 1 401 185 | 3/2004 |
| EP | 1 731 993 | 12/2006 |
| EP | 1748350 | 1/2007 |
| GB | 2 416 962 | 2/2006 |
| JP | 11-212725 | 8/1999 |
| JP | 2004-265281 | 9/2004 |
| JP | 2005-258666 | 9/2005 |
| JP | 2006-228151 | 8/2006 |
| JP | 2009-003867 | 1/2009 |
| KR | 10-2009-0024006 | 3/2009 |
| WO | WO 2001/054109 | 7/2001 |
| WO | WO 2002/073587 | 9/2002 |
| WO | WO 2004/044728 | 5/2004 |
| WO | WO 2004/051451 | 6/2004 |
| WO | WO 2004/075169 | 9/2004 |
| WO | WO 2005/103863 | 11/2005 |
| WO | WO 2006/042309 | 4/2006 |
| WO | WO 2007/120562 | 10/2007 |
| WO | WO 2007117418 | 10/2007 |
| WO | WO 2008/037275 | 4/2008 |
| WO | WO 2008/042745 | 4/2008 |
| WO | WO 2008/103535 | 8/2008 |
| WO | WO 2008/132540 | 11/2008 |
| WO | WO 2008/144108 | 11/2008 |
| WO | WO 2009/002605 | 12/2008 |
| WO | WO 2009/026337 | 2/2009 |
| WO | WO 2009/074185 | 6/2009 |
| WO | 2010/105012 | 9/2010 |

OTHER PUBLICATIONS

De Witt, A., "Designing Sonification of User Data in Affective Interaction," Master of Science Thesis Stockholm, Sweden, XP 002551466, at hppt://w3.nada.kth.se/utbildning/grukth/exjobb/rapportlistor/2007/de_witt_anna_07142, as available via the Internet and printed Oct. 20, 2009.

Kaaresoja, T. et al., "Snap-Crackle-Pop: Tactile Feedback for Mobile Touch Screens," Proceedings of the Eurohaptics 2006, XP 002551465, at http://lsc.univ-evry.fr/(eurohaptics/upload/cd/papers/f80, as available via the Internet and printed Oct. 20, 2009.

Maeno, T. et al., "Tactile Display of Surface Texture by use of Amplitude Modulation of Ultrasonic Vibration," IEEE Ultrasonics Symposium, 2006, pp. 62-65.

Minsky, Margaret Diane Rezvan, "Computational Haptics: The Sandpaper System for Synthesizing Texture for a Force-Feedback Display," Ph.D. Dissertation, Massachusetts Institute of Technology, Jun. 1995, 217 pages.

(56) References Cited

OTHER PUBLICATIONS

Oakley, I. et al., Contact IM: Exploring Asynchronous Touch over Distance, Palpable Machines Research Group, Media Lab Europe, XP 007910188, at http://people.cs.vt.edu/[wangr06/touch%2Oreview%origization/OAK002, as available via the Internet and printed Oct. 20, 2009.
Rovers, A. et al., HIM: A Framework for Haptic Instant Messaging, CHI 2004 (CHI Conference Proceedings, Human Factors in Computing Systems), XP 002464573, Vienna Austria, Apr. 2004, p. 1313-1316.
Sekiguchi, Y. et al., "Haptic Interface using Estimation of Box Contents Metaphor," Proceedings of ICAT 2003, Tokyo, Japan, XP 002551467, at http://www.vrsj.org/ic-at/papers/2003/00947_00000, as available via the Internet and printed Oct. 20, 2009.
Watanabe, T. et al., "A Method for Controlling Tactile Sensation of Surface Roughness Using Ultrasonic Vibration," IEEE International Conference on Robotics and Automation, 0-7803-1965-6/95, 1995, pp. 1134-1139.
Williamson, J. et al., "Shoogle: Excitatory Multimodal Interaction on Mobile Devices," CHI 2007 Proceedings-Shake, Rattle and Roll: New Forms of Input and Output, 2007, pp. 121-124, XP002549378.
International Preliminary Report on Patentability dated Sep. 22, 2011 for corresponding International Application No. PCT/US2010/026909.
International Preliminary Report on Patentability dated Sep. 22, 2011 for corresponding International Application No. PCT/US2010/026897.
International Preliminary Report on Patentability dated Sep. 22, 2011 for corresponding International Application No. PCT/US2010/026905.
International Preliminary Report on Patentability dated Sep. 22, 2011 for corresponding International Application No. PCT/US2010/026894.
International Preliminary Report on Patentability dated Sep. 22, 2011 for corresponding International Application No. PCT/US2010/026907.
International Preliminary Report on Patentability dated Sep. 22, 2011 for corresponding International Application No. PCT/US2010/026900.
Search Report and Written Opinion dated Jun. 8, 2010 for corresponding PCT Application No. PCT/US2010/026909.
Search Report and Written Opinion dated Jun. 8, 2010 for corresponding PCT Application No. PCT/US2010/026897.
Search Report and Written Opinion dated Jun. 8, 2010 for corresponding PCT Application No. PCT/US2010/026905.
Search Report and Written Opinion dated Jun. 8, 2010 for corresponding PCT Application No. PCT/US2010/026894.
Search Report and Written Opinion dated Jun. 8, 2010 for corresponding PCT Application No. PCT/US2010/026907.
Search Report and Written Opinion dated Jun. 8, 2010 for corresponding PCT Application No. PCT/US2010/026900.
Office Action dated Nov. 2, 2012 for corresponding U.S. Appl. No. 12/947,321.
Corel Paint Shop Pro Photo X2 Reviewer's Guide, Copyright 2007, web page at http://web.archive.org/web/20071102133023/http://www.corel.com/conte nt!vpk!psppx2/PS P PX2Reviewer_Guide.pdf, as available via the Internet and accessed Apr. 7, 2012.
Chowdhury, M.A. et al., "The Effect of Amplitude of Vibration on the Coefficient of Friction for Different Materials," Tribology International, 2008, 41:307-314.
Tang, H. et al., "A Microfabricated Electrostatic Haptic Display for Persons with Visual Impairments," IEEE Transactions on Rehabilitation Engineering, Sep. 1998, 6(3):241-314.
Office Action dated Nov. 15, 2012 for corresponding U.S. Appl. No. 12/947,532.
Office Action dated Jan. 15, 2013 for corresponding U.S. Appl. No. 12/696,908.
Office Action dated Jan. 15, 2013 for corresponding U.S. Appl. No. 12/696,900.

Kumazawa, I., Seeking user interface casually used immediately after touched, ITE Technical Report, The Institute of Image Information and Television Engineers, Aug. 29, 2005, vol. 29, No. 46, p. 67-70.
Japanese Patent Office, Decision of Rejection, Application No. JP 2011-554175 dated Mar. 1, 2016.
Japanese Patent Office, Notice of Reasons for Rejection, Application No. JP 2015-020413 dated Mar. 1, 2016.
Japanese Patent Office, Notice of Reasons for Rejection, Application No. JP 2015-019308 dated Feb. 26, 2016.
Japanese Patent Office, Notice of Reasons for Rejection, Application No. JP 2014-171836, dated Nov. 4, 2015.
Japanese Patent Office, Notice of Reasons for Rejection, Application No. JP 2011-554174, dated Jan. 28, 2014.
Korean Patent Office, Notice of Preliminary Rejection, Application No. 10-2011-7023927, dated Sep. 30, 2015.
Korean Patent Office, Notice of Preliminary Rejection, Application No. 10-2011-7023926, dated Sep. 30, 2015.
State Intellectual Property Office of the Peoples Republic of China, Notification of the Second Office Action, Application No. 201080011708 dated Jul. 10, 2014.
State Intellectual Property Office of the Peoples Republic of China, Notification of the Third Office Action, Application No. 201080011708 dated Jan. 26, 2015.
Japanese Patent Office, Office Action, Application No. JP 2015-083829 dated Feb. 16, 2016.
Japanese Patent Office, Notice of Reasons for Rejection, Application No. JP 2011-554180 dated Jan. 7, 2014.
Japanese Patent Office, Decision of Rejection, Application No. JP 2011-554180 dated Dec. 16, 2014.
State Intellectual Property Office of the Peoples Republic of China, Notification of the Second Office Action, Application No. 201080011743 dated Apr. 3, 2014.
State Intellectual Property Office of the Peoples Republic of China, Decision on Rejection, Application No. 201080011743 dated Nov. 3, 2014.
State Intellectual Property Office of the Peoples Republic of China, Notification of the First Office Action, Application No. 201080011744 dated Sep. 23, 2013.
Japanese Patent Office, Notice of Reasons for Rejection, Application No. JP 2011-554172 dated Jan. 28, 2014.
State Intellectual Property Office of the Peoples Republic of China, Notification of the Second Office Action, Application No. 201080011744 dated Jun. 24, 2014.
State Intellectual Property Office of the Peoples Republic of China, Notification of the Third Office Action, Application No. 201080011744 dated Dec. 16, 2014.
State Intellectual Property Office of the Peoples Republic of China, Notification of the Fourth Office Action, Application No. 201080011744 dated Aug. 12, 2015.
Korean Patent Office, Notice of Preliminary Rejection, Application No. 10-2011-7023987 dated Aug. 21, 2015.
Japanese Patent Office, Office Action, Application No. JP 2015-019308 dated Mar. 1, 2016.
United States Patent and Trademark Office, Office Action, U.S. Appl. No. 12/696,893 dated Feb. 29, 2012.
United States Patent and Trademark Office, Office Action, U.S. Appl. No. 12/696,893 dated Sep. 6, 2012.
United States Patent and Trademark Office, Office Action, U.S. Appl. No. 12/696,893 dated Jun. 6, 2013.
United States Patent and Trademark Office, Office Action, U.S. Appl. No. 12/696,893 dated Oct. 22, 2013.
United States Patent and Trademark Office, Office Action, U.S. Appl. No. 12/696,893 dated Mar. 11, 2014.
Meyer, D. et al., Fingertip Friction Modulation due to Electrostatic Attraction, IEEE World Haptics Conference 2013, Apr. 14-18, Korea, pp. 43-48.
United States Patent and Trademark Office, Office Action, U.S. Appl. No. 12/696,900 dated Aug. 19, 2016.
United States Patent and Trademark Office, Office Action, U.S. Appl. No. 12/697,010 dated May 20, 2016.
United States Patent and Trademark Office, Office Action, U.S. Appl. No. 12/697,042 dated May 17, 2016.

(56) References Cited

OTHER PUBLICATIONS

United States Patent and Trademark Office, Office Action, U.S. Appl. No. 12/696,900 dated May 9, 2016.
United States Patent and Trademark Office, Office Action, U.S. Appl. No. 12/696,908 dated May 26, 2016.
Korean Patent Office, Office Action, Application No. 10-2011-7023928 dated Apr. 28, 2016.
Chinese Patent Office, Decision of Reexamination, Application No. 201080011905 dated Apr. 11, 2016.
Korean Patent Office, Notice of Preliminary Rejection, Application No. 10-2016-7024890 dated Oct. 21, 2016.
United States Patent and Trademark Office, Office Action, U.S. Appl. No. 12/696,908 dated Nov. 10, 2016.
United States Patent and Trademark Office, Office Action, U.S. Appl. No. 12/697,010 dated Sep. 16, 2016.
United States Patent and Trademark Office, Office Action, U.S. Appl. No. 12/947,532 dated Sep. 9, 2016.
United States Patent and Trademark Office, Office Action, U.S. Appl. No. 12/696,900 dated Dec. 12, 2016.
United States Patent and Trademark Office, Office Action, U.S. Appl. No. 12/697,042 dated Nov. 30, 2016.
United States Patent and Trademark Office, Office Action, U.S. Appl. No. 12/947,532 dated Feb. 2, 2017.
United States Patent and Trademark Office, Office Action, U.S. Appl. No. 12/697,010 dated Feb. 22, 2017.
Japanese Patent Office, Office Action, Application No. JP 2016-123698 dated Feb. 7, 2017.
European Patent Office Application No. 10787610.4, Communication Pursuant to Article 94(3) EPC dated Aug. 21, 2017, 7 pages.
Korean Patent Office Application No. R10-2017-7019986, Office Action dated Sep. 8, 2017, 10 pages.
U. S. Appl. No. 12/696,908, Non-Final Office Action dated Sep. 21, 2017, 20 pages.
U. S. Appl. No. 12/947,321, Final Office Action dated Oct. 3, 2017, 35 pages.
U. S. Appl. No. 12/947,532, Final Office Action dated Sep. 8, 2017, 33 pages.
European Patent Office Application No. 17181965.9, Extended European Search Report dated Nov. 14, 2017, 13 pages.

* cited by examiner

SYSTEMS AND METHODS FOR USING TEXTURES IN GRAPHICAL USER INTERFACE WIDGETS

CROSS-REFERENCES TO RELATED APPLICATIONS

This patent application claims priority to U.S. Provisional Patent Application No. 61/159,482, entitled "Locating Features Using a Friction Display," filed Mar. 12, 2009, which is incorporated by reference herein in its entirety.

This patent application claims priority to: U.S. Provisional Patent Application No. 61/262,041, entitled "System and Method for Increasing Haptic Bandwidth in an Electronic Device," filed Nov. 17, 2009, which is incorporated by reference herein in its entirety.

This patent application claims priority to U.S. Provisional Patent Application No. 61/262,038, entitled "Friction Rotary Device for Haptic Feedback," filed Nov. 17, 2009, which is incorporated by reference herein in its entirety.

This patent application is related to U.S. patent application Ser. No. 12/697,010, filed the same day as the present application and entitled "Systems and Methods for a Texture Engine," , which is incorporated by reference herein in its entirety.

This patent application is related to U.S. patent application Ser. No. 12/694,042, filed the same day as the present application and entitled "Systems and Methods for Using Multiple Actuators to Realize Textures," , which is incorporated by reference herein in its entirety.

This patent application is related to U.S. patent application Ser. No. 12/696,893, filed the same day as the present application and entitled "Systems and Methods for Providing Features in a Friction Display," , which is incorporated by reference herein in its entirety.

This patent application is related to U.S. patent application Ser. No. 12/696,900, filed the same day as the present application and entitled "Systems and Methods for Friction Displays and Additional Haptic Effects," , which is incorporated by reference herein in its entirety.

This patent application is related to U.S. patent application Ser. No. 12/696,908, filed the same day as the present application and entitled "Systems and Methods for Interfaces Featuring Surface-Based Haptic Effects," , which is incorporated by reference herein in its entirety.

FIELD OF THE INVENTION

The present invention generally relates to haptic feedback and more particularly to systems and methods for using textures in graphical user interface widgets.

BACKGROUND

Over the past several years, the use of devices that incorporate touch-screens and haptic feedback has grown exponentially. These devices are used as portable organizers, telephones, music players, and gaming systems. As haptic technology improves, devices may incorporate haptic effects configured to simulate textures. Accordingly, systems and methods for using textures in graphical user interface widgets are needed.

SUMMARY

Embodiments of the present invention provide systems and methods for using textures in graphical user interface widgets. For example, in one embodiment, a system for using textures in graphical user interface widgets comprises: an actuator configured to receive a haptic signal and output a haptic effect based at least in part on the haptic signal, the haptic effect configured to simulate a texture; a touch-sensitive interface configured to detect a user interaction and output a interface signal; and a processor in communication with the actuator and the touch-sensitive interface, the processor configured to: receive the interface signal; receive a display signal comprising a plurality of pixels defining a display area; determine a first texture associated with a first group of pixels defining a first section of the display area; determine a second texture associated with a second group of pixels defining a second section of the display area; and transmit a haptic signal configured to cause the actuator to: output a first haptic effect configured to simulate the first texture if the user interaction is associated with the first section of the display area, and output a second haptic effect configured to simulate the second texture if the user interaction is associated with the second section of the display area.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
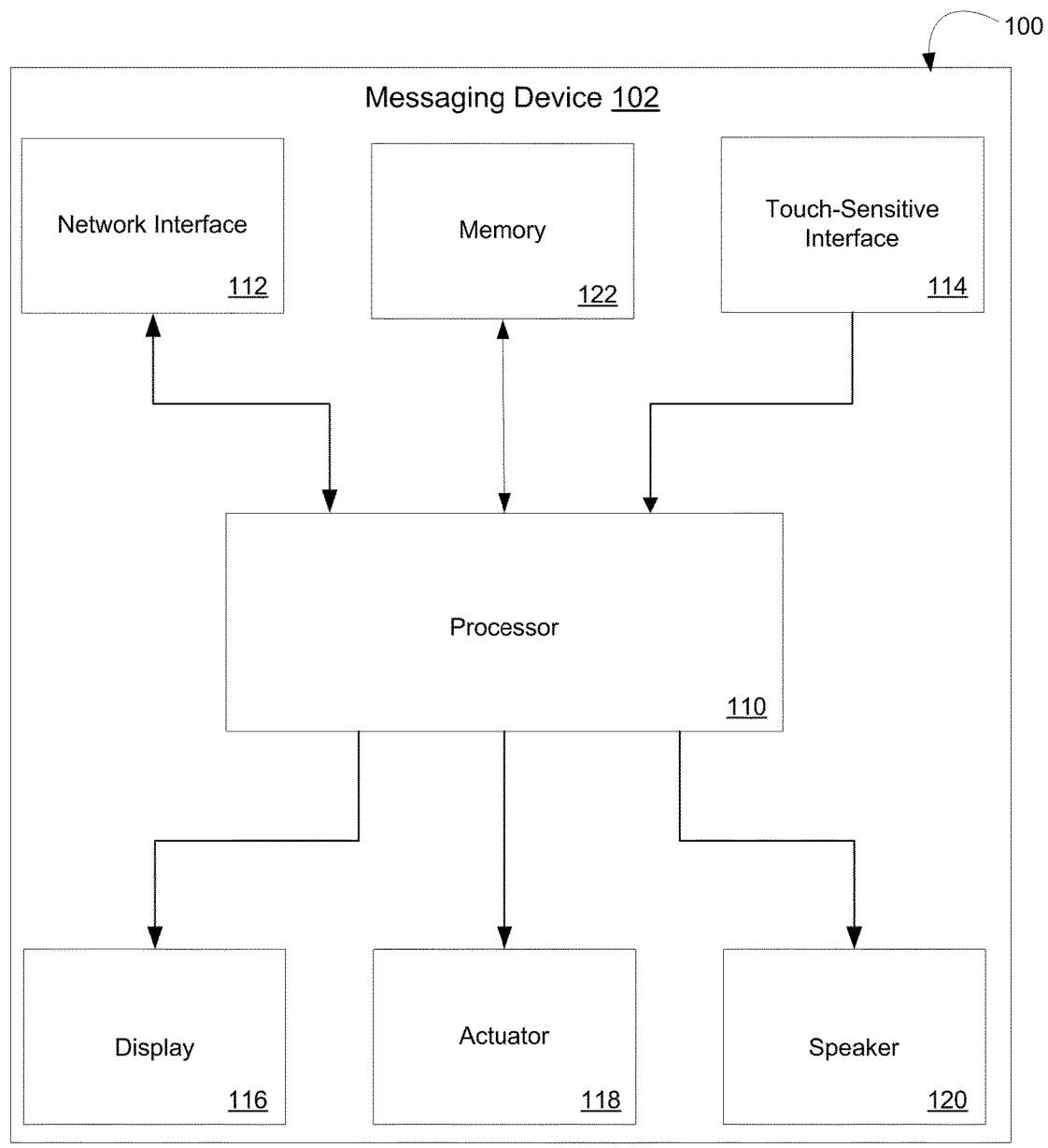
FIG. 1 is a block diagram of a system for using textures in graphical user interface widgets according to one embodiment of the present invention.

Embodiments of the present invention provide systems and methods for using textures in graphical user interface widgets.

Illustrative Embodiment of a System for Using Textures in Graphical User Interface Widgets One illustrative embodiment of the present invention comprises a messaging device, such as a mobile phone. In the illustrative embodiment, the messaging device comprises the Samsung Haptic Phone (SCH-W420) equipped with Immersion Corporation's TouchSense® 3000, TouchSense® 4000, or TouchSense® 5000 vibrotactile feedback systems, formerly known as Immersion Corporation's VibeTonz® vibrotactile feedback system. In other embodiments, different messaging devices and haptic feedback systems may be utilized.

The illustrative messaging device comprises a display, a speaker, a network interface, a memory, and a processor in communication with each of these elements. The illustrative messaging device also comprises a touch-sensitive interface and an actuator, both of which are in communication with the processor. The touch-sensitive interface is configured to sense a user's interaction with the messaging device, and the actuator is configured to output a haptic effect. The illustrative messaging device may further comprise a manipulandum configured to detect a user interaction and transmit an interface signal associated with the user interaction to the processor.

In the illustrative messaging device, the display is configured to display a graphical user interface to the user. The graphical user interface may comprise virtual objects, for example icons, buttons, or a virtual keyboard. The illustrative messaging device further comprises a touch-sensitive interface, such as a touch-screen, mounted overtop of the display. The touch-sensitive interface allows the user to interact with the virtual objects displayed in the graphical user interface. For example, in one embodiment, the graphical user interface may comprise a virtual keyboard. In such an embodiment, the touch-sensitive interface allows the user to touch a key on the virtual keyboard to input the alphanumeric character associated with that key. This functionality may be used to type messages, or otherwise interact with objects in the graphical user interface.

In the illustrative messaging device the processor is configured to determine a haptic effect and transmit a haptic signal corresponding to the haptic effect to an actuator configured to output the haptic effect. In the illustrative messaging device, this haptic effect simulates a texture that the user feels on the surface of the touch-sensitive interface. The simulated texture may be associated with the user interface shown on the display. For example, the display may show an icon comprising the shape of a rock. In such an embodiment, the processor may determine a haptic effect configured to simulate the texture of the rock on the surface of the touch-sensitive interface. Then, the processor will transmit a haptic signal to an actuator configured to output the haptic effect. When the actuator receives the haptic signal it will output a haptic effect, such as a vibration, at a frequency configured to cause the surface of the touch-sensitive interface to approximate the texture of the rock.

In the illustrative embodiment, the processor may implement a haptic map to determine the haptic effect. For example, in the illustrative embodiment, the processor may receive a display signal comprising a plurality of pixels, each of the pixels associated with a color. For example, in the illustrative embodiment, each pixel in the display signal may be associated with the color red, green, or blue, and may further be associated with an intensity for each color. In the illustrative embodiment, the processor will assign a haptic value to each color and further assign a haptic intensity associated with the intensity of each color. Then, the processor will transmit a haptic signal comprising the haptic values and haptic intensities to an actuator configured to output the haptic effect.

In the illustrative embodiment, the processor may further determine the haptic effect based on an external trigger. For example, in the illustrative embodiment, the processor is configured to receive an interface signal from a touch-sensitive interface configured to detect a user interaction. Then, in the illustrative embodiment, the processor will determine the haptic effect based at least in part on the interface signal. For example, the processor may modify the haptic value or haptic intensity based at least in part on the interface signal. In the illustrative embodiment, if the touch-sensitive interface detects a high speed or high pressure user interaction, the processor will determine a higher intensity haptic effect.

The illustrative messaging device may output a haptic effect for a multitude of purposes. For example, in one embodiment, the haptic effect may act as a confirmation that the processor has received an interface signal associated with a user interaction. For example, the graphical user interface may comprise a button, and the touch-sensitive interface may detect user interaction associated with pressing the button and transmit an interface signal to the processor. In response, the processor may determine a haptic effect to confirm receiving the interface signal. In such an embodiment, the haptic effect may cause the user to feel a texture on the surface of the touch-sensitive interface. In the illustrative embodiment, the processor may further determine haptic effects for other purposes. For example, the illustrative messaging device may output a texture to alert the user to boundaries on the display or as an identification for objects such as icons on the surface of the display.

This illustrative example is given to introduce the reader to the general subject matter discussed herein. The invention is not limited to this example. The following sections describe various additional non-limiting embodiments and examples of systems and methods for using textures in graphical user interface widgets.

Illustrated System for Using Textures in Graphical User Interface Widgets

Referring now to the drawings in which like numerals indicate like elements throughout the several figures, FIG. 1 is a block diagram of a system for using textures in graphical user interface widgets according to one embodiment of the present invention. As shown in FIG. 1, the system 100 comprises a messaging device 102, such as a mobile phone, portable digital assistant (PDA), portable media player, portable computer, portable gaming device, or some other mobile device. In some embodiments, messaging device 102 may comprise a laptop, tablet, desktop PC, or other similar device. In still other embodiments, the messaging device may comprise an external monitor for use with a PC or some other device. The messaging device 102 comprises a processor 110 in communication with a network interface 112, a touch-sensitive interface 114, a display 116, an actuator 118, a speaker 120, and a memory 122.

The processor 110 is configured to execute computer-executable program instructions stored in memory 122. For example, processor 110 may execute one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. Processor 110 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 122 comprises a computer-readable medium that stores instructions, which when executed by processor 110, cause processor 110 to perform various steps, such as those described herein. Embodiments of computer-readable media may comprise, but are not limited to, an electronic, optical, magnetic, or other storage or transmission devices capable of providing processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. In addition, various other devices may include computer-readable media such as a router, private or public network, or other transmission devices. The processor 110 and the processing described may be in one or more structures, and may be dispersed throughout one or more structures.

Processor 110 is in communication with the network interface 112. The network interface 112 may comprise one or more methods of mobile communication, such as infrared, radio, Wi-Fi, or cellular network communication. In other variations, the network interface 112 comprises a wired network interface, such as Ethernet. The messaging device 102 can be configured to exchange messages or virtual message objects with other devices (not shown) over networks such as a cellular network and/or the Internet. Embodiments of messages exchanged between devices may comprise voice messages, text messages, data messages, or other forms of digital messages.

The processor 110 is also in communication with one or more touch-sensitive interfaces 114. In some embodiments, touch-sensitive interface 114 may comprise a touch-screen or a touch-pad. For example, in some embodiments, touch-sensitive interface 114 may comprise a touch-screen mounted overtop of a display configured to receive a display signal and output an image to the user. In other embodiments, touch-sensitive interface 114 may comprise an optical sensor or another type of sensor. In one embodiment, touch-sensitive interface may comprise an LED detector. For example, in one embodiment, touch-sensitive interface 114 may comprise an LED finger detector mounted on the side of display 116. In some embodiments, the processor is in communication with a single touch-sensitive interface 114, in other embodiments, the processor is in communication with a plurality of touch-sensitive interfaces, for example, a first touch-screen and a second touch screen. The touch-sensitive interface 114 is configured to detect user interaction, and based on the user interaction, transmit signals to processor 110. In some embodiments, touch-sensitive interface 114 may be configured to detect multiple aspects of the user interaction. For example, touch-sensitive interface 114 may detect the speed and pressure of a user interaction, and incorporate this information into the interface signal.

In the embodiment shown in FIG. 1, the processor 110 is also in communication with a display 116. The processor 110 can be configured to generate a graphical representation of a user interface to be shown on display 116, then transmit a display signal comprising the graphical representation to display 116. In other embodiments, display 116 is configured to receive a display signal from another device. For example, in some embodiments, display 116 may comprise an external display, such as a computer monitor. Display 116 is configured to receive a display signal and output an image associated with that display signal. In some embodiments, the display signal may comprise a vga, hdmi, svga, video, s-video, or other type of display signal known in the art. In some embodiments, display 116 comprises a flat screen display, such as a Liquid Crystal Display (LCD) or Plasma Screen Display. In other embodiments display 116 comprises a Cathode Ray Tube (CRT) or other type of display known in the art. In still other embodiments, display 116 may comprise touch-sensitive interface 114, for example, display 116 may comprise a touch-screen LCD. In still other embodiments, display 116 may comprise a flexible screen or flexible display. For example, in some embodiments, display 116 may comprise a haptic substrate mounted underneath its surface. In such an embodiment, display 116 is made of a flexible material, and in response to signals received from processor 110, the haptic substrate flexes, forming ridges, troughs, or other features on the surface of display 116. In some embodiments, the haptic substrate may comprise a plasma actuator, a piezoelectric actuator, an electro-active polymer, a micro-electro-mechanical system, a shape memory alloy, a grid of fluid or gas-filled cells.

In some embodiments, processor 110 receives signals from touch-sensitive interface 114 that are associated with an interaction with the graphical user interface shown on display 116. For example, in one embodiment, touch-sensitive interface 114 may comprise a touch-screen and a graphical user interface on display 116 may comprises a virtual keyboard. In such an embodiment, when the user interacts with a section of the touch-screen that overlays one of the keys of the virtual keyboard, the touch-screen will send an interface signal to processor 110 corresponding to that user interaction. Based on the interface signal, processor 110 will determine that the user pressed one of the keys on the virtual keyboard. This functionality allows the user to interact with other icons and virtual objects on the display 116. For example, in some embodiments the user may flick the touch-screen to move a virtual ball or turn a virtual knob.

As shown in FIG. 1, processor 110 is also in communication with an actuation system comprising one or more actuators 118, a suspension system for each actuator, and electrical power and control wiring for each actuator. In some embodiments, messaging device 102 comprises more than one actuation system. Processor 110 is configured to determine a haptic effect and transmit a haptic signal corresponding to the haptic effect to actuator 118. In some embodiments, the haptic effect comprises a vibrotactile texture felt on the surface of display 116, touch-sensitive interface 114, or the housing of messaging device 102. In some embodiments, determining a haptic effect may comprise a series of calculations to determine the haptic effect. In other embodiments, determining the haptic effect may comprise accessing a lookup table to determine the appropriate haptic effect. In still other embodiments, determining the haptic effect may comprise a combination of lookup tables and algorithms.

In some embodiments, determining the haptic effect may comprise a haptic map. In such an embodiment, determining the haptic effect may comprise mapping the display signal to the actuators. For example, the display signal may comprise a plurality of pixels, each of the pixels associated with a color. In such an embodiment, each pixel may be associated with the color red, green, or blue; each color may further be associated with an intensity, for example, an intensity of 1-8. In such an embodiment, determining the haptic effect may comprise assigning a haptic effect to each color. In some embodiments, the haptic effect may comprise a direction and intensity of operation, for example, in one embodiment the haptic signal may be configured to cause a rotary actuator to rotate clockwise at one-half power. In some embodiments, the intensity of operation may be associated with the intensity of the color. Once processor 110 determines a haptic effect, it transmits a haptic signal comprising the haptic effect. In some embodiments, processor 110 may assign a haptic effect to only some of the pixels in the display signal. For example, in such an embodiment, the haptic effect may be associated with only a portion of the display signal.

In some embodiments, processor 110 may utilize a haptic map to determine the haptic effect and then output the display signal to display 116. In other embodiments, processor 110 may determine the haptic effect using a haptic map, and then not transmit the display signal to display 116. In such an embodiment, the display 116 may stay dark, or off, while actuator 118 is outputting the haptic effect. For example, in such an embodiment, processor 110 may receive a display signal from a digital camera associated with messaging device 102. In some embodiments, in order to conserve battery power, the user may have deactivated display 116. In such an embodiment, the processor may utilize a haptic map to provide the user with a haptic effect simulating a texture on the surface of the display. This texture may be used to alert the user when the camera is in focus, or when some other event has occurred. For example, processor 110 may use facial recognition software to determine haptic effects simulating textures at locations on display 116 that would be associated with faces if display 116 were activated.

In some embodiments, processor 110 may determine the haptic effect based at least in part on a user interaction or trigger. In such an embodiment, processor 110 receives an interface signal from touch-sensitive interface 114, and determines the haptic effect based at least in part on the interface signal. For example, in some embodiments, processor 110 may determine the haptic effects based on the location of the user interaction detected by touch-sensitive interface 114. For example, in one embodiment, processor 110 may determine a haptic effect that simulates the texture of a virtual object that the user is touching on display 116. In other embodiments, processor 110 may determine the intensity of the haptic effect based at least in part on the interface signal. For example, if touch-sensitive interface 114 detects a high pressure user interaction, processor 110 may determine a high intensity haptic effect. In another embodiment, if touch-sensitive interface 114 detects a low pressure user interaction, processor 110 may determine a low intensity haptic effect. In still other embodiments, processor 110 may determine the intensity of the haptic effect based at least in part on the speed of the user interaction. For example, in one embodiment, processor 110 may determine a low intensity haptic effect when touch-sensitive interface 114 detects low speed user interaction. In still other embodiments, processor 110 may determine no haptic effect, unless it receives an interface signal associated with user interaction from touch-sensitive interface 114.

Once processor 110 determines the haptic effect, it transmits a haptic signal associated with the haptic effect to actuator 118. Actuator 118 is configured to receive a haptic signal from processor 110 and generate the haptic effect. Actuator 118 may be, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, actuator 118 may comprise a plurality of actuators, for example an ERM and an LRA.

In some embodiments of the present invention, the haptic effect generated by actuator 118 is configured to simulate a texture that the user feels on the surface of touch-sensitive interface 114 or display 116. This texture may be associated with the graphical user interface shown on display 116. For example, display 116 may show an icon comprising the shape of a rock. In such an embodiment, processor 110 may determine a haptic effect configured to simulate the texture of a rock on the surface of touch-sensitive interface 114. Then, processor 110 will transmit a haptic signal associated with the haptic effect to actuator 118, which outputs the haptic effect. For example, when actuator 118 receives the haptic signal, it may output a vibration at a frequency configured to cause the surface of the touch-sensitive interface to comprise the texture of a rock. In other embodiments, actuator 118 may be configured to output a vibration at a frequency that causes the surface of display 116 or touch-sensitive interface 114 to comprise the texture of: water, ice, leather, sand, gravel, snow, skin, fur, or some other surface. In some embodiments, the haptic effect may be output onto a different portion of messaging device 102, for example onto its housing. In some embodiments, actuator 118 may output a multitude of vibrations configured to output multiple textures at the same time. For example, actuator 118 may output a vibration configured to cause the surface of display 116 to comprise the texture of sand, and, actuator 118 may also be configured to output additional vibrations, configured to cause the user to feel the texture of rocks in the sand.

In some embodiments, not shown in FIG. 1, messaging device 102 may comprise multiple actuators. In an embodiment comprising two or more actuators, each actuator may output different haptic effects at the same time, thus increasing the richness of available haptic effects. For example, each actuator may output a different frequency or type of haptic effect, which is configured to simulate a different texture. In some embodiments, the user may feel these textures at the same time, but at different locations, on the messaging device 102. For example, in one embodiment, a first actuator may output a first haptic effect configured to simulate a texture on a first icon, while at the same time, a second actuator may output a second haptic effect configured to simulate a second texture on a second icon. In such an embodiment, the user may feel the first texture on the first icon and, at the same time, feel the second texture on the second icon. In other embodiments, both actuators may be configured to output separate haptic effects that, when combined, are configured to simulate a single texture. Further, in some embodiments, not shown in FIG. 1, messaging device 102 may comprise multiple displays. In some embodiments, each display may be associated with more than one actuator. In such an embodiment, the user may interact with one of the displays, and feel a corresponding haptic effect on the other display.

Processor 110 may determine a haptic effect for many reasons. For example, in some embodiments, processor 110 may output a haptic effect that corresponds to the texture of an object shown on display 116. In such an embodiment, the display may show multiple objects, and the processor may determine a different haptic effect as the user moves his/her finger from object to object, thus simulating a different texture for each object. In some embodiments, the haptic effect may act as a confirmation that processor 110 has received a signal associated with user interaction. For example, in one embodiment, the graphical user interface may comprise a button and touch-sensitive interface 114 may detect user interaction associated with pressing the button. When touch-sensitive interface 114 transmits an interface signal associated with the user interaction to processor 110, processor 110 may determine a haptic effect to confirm receipt of the interface signal. In such an embodiment, the haptic effect may cause the user to feel a texture on the surface of touch-sensitive interface 114. For example, the processor may output a haptic effect that simulates the texture of sand to confirm that processor 110 has received the user input. In other embodiments, the processor may determine a different texture, for example, the texture of water, ice, oil, rocks, or skin. In some embodiments, the haptic effect may serve a different purpose, for example, alerting the user of boundaries on display 116, or providing the user with haptic information about the image on display 116. For example, in some embodiments, each icon on display 116 may comprise a different texture and when the user moves their finger from one icon to another, the processor will determine a haptic effect that simulates the texture of each icon. In further embodiments, the processor may change the texture when the user's finger moves from contact with an icon to contact with the background of the display, thus alerting the user that he/she is no longer touching the icon.

As shown in FIG. 1, processor 110 is also in communication with speaker 120. Speaker 120 is configured to receive audio signals from processor 110 and output them to the user. In some embodiments, the audio signals may be associated with the haptic effect output by actuator 118, or the image output by display 116. In other embodiments, the audio signal may not correspond to the haptic effect or the image.

In some embodiments, not shown in FIG. 1, processor 110 may further comprise one or more sensors, for example, a GPS sensor, an imaging sensor, accelerometer, location sensor, rotary velocity sensor, light sensor, camera, microphone, or some other type of sensor. The sensor may be configured to detect changes in acceleration, inclination, inertia, or location. For example, messaging device 102 may comprise an accelerometer configured to measure the messaging device's acceleration. The sensor is configured to transmit sensor signals to processor 110.

The sensor signals may comprise one or more parameters associated with a position, a movement, an acceleration, or a "jerk" (i.e. the derivative of acceleration) of the messaging device 102. For example, in one embodiment, the sensor may generate and transmit a sensor signal comprising a plurality of parameters, each parameter associated with a movement along or about one measured translational or rotational axis. In some embodiments, the sensor outputs voltages or currents that processor 110 is programmed to interpret to indicate movement along one or more axes.

In some embodiments, processor 110 will receive the sensor signal and determine that it should activate the virtual workspace and interpret sensed movement of the messaging device 102 in an X, Y, or Z direction as corresponding to a virtual movement "within" the virtual workspace. The user may then move device 102 within the virtual workspace to select functions or files, by gesturing within the virtual space. For example, by moving the messaging device 102 in the Z-Axis overtop of a function within the virtual workspace. In some embodiments, the user may use gestures within the virtual workspace to modify the haptic effects output by messaging device 102.

Figure 2:
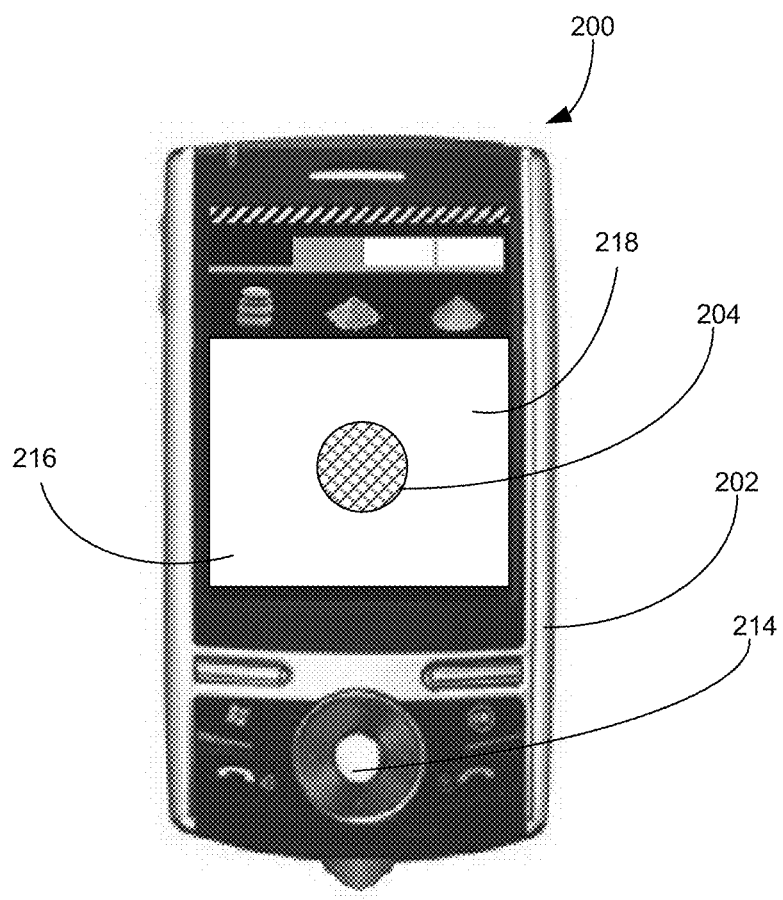
FIG. 2 is an illustration of a system for using textures in graphical user interface widgets according to one embodiment of the present invention.

FIG. 2 is an illustration of a system for using textures in graphical user interface widgets according to one embodiment of the present invention. FIG. 2 comprises a messaging device 200, such as a mobile phone, PDA, portable media player, portable gaming device, or mobile computer. The messaging device 200 is configured to send and receive signals, such as voicemail, text messages, and other data messages, over a network such as a cellular network or the Internet. The messaging device 200 may comprise a wireless network interface and/or a wired network interface (not shown in FIG. 2). Although the device 200 is illustrated as a handheld messaging device in FIG. 2, other embodiments may comprise different devices, such as video game systems and/or personal computers.

As shown in FIG. 2, the messaging device 200 comprises a housing 202 and a display 216. In some embodiments, display 216 may comprise an LCD display. In other embodiments, display 216 may comprise a plasma display, or other type of display known in the art. Display 216 is configured to receive a display signal and output an image associated with that display signal. In some embodiments, the display signal may comprise a vga, hdmi, svga, video, s-video, or other type of display signal known in the art. In the embodiment shown in FIG. 2, display 216 comprises a textured ball 204. Display 216 further comprises texture selection icons 206. Texture selection icons 206 comprise rocks, sand, and water.

Referring still to FIG. 2, the messaging device 200 further comprises a manipulandum 214. In the embodiment shown in FIG. 2, the manipulandum 214 comprises a roller ball and buttons. The messaging device 200 also comprises a touch-sensitive interface 218. In the embodiment shown in FIG. 2, the touch-sensitive interface comprises a touch-screen positioned overtop of display 216. In some embodiments, display 216 and the touch-screen may comprise a single integrated component, such as a touch-screen display.

Manipulandum 214 and touch-sensitive interface 218 are configured to detect user interaction and transmit interface signals corresponding to the user interaction to the processor. In some embodiments, the user interaction is associated with a graphical user interface shown on display 216. In such an embodiment, the processor receives the interface signal and, based at least in part on the interface signal, modifies the graphical user interface on display 216. For example, in the embodiment shown in FIG. 2, the user may use either manipulandum 214 or touch-sensitive interface 218 to select one of texture selection icons 206. Once the user has selected a texture for textured ball 204, its appearance on the display may change to correspond to that texture. For example, if the user selects the sand texture icon, the processor will determine a haptic effect that causes the user to feel a sandy texture when the user interacts with textured ball 204. Or, in another embodiment, if the user selects the rocky texture icon, the processor may determine a haptic effect that causes the user to feel a rocky texture when the user interacts with textured ball 204.

Messaging device 200 further comprises an actuator configured to receive a haptic signal and output a haptic effect (not shown in FIG. 2). In some embodiments, the haptic effect comprises a vibrotactile texture felt by the user of messaging device 200. Processor 110 is configured to determine a haptic effect and transmit a haptic signal corresponding to the haptic effect to the actuator. In some embodiments, determining a haptic effect may comprise performing a series of calculations. In other embodiments, determining the haptic effect may comprise accessing a lookup table. In still other embodiments, determining the haptic effect may comprise using a combination of lookup tables and algorithms. Once processor 110 determines the haptic effect, it transmits a haptic signal associated with the haptic effect to the actuator. The actuator receives the haptic signal from processor 110 and outputs the haptic effect. The user may feel the haptic effect via the surface of display 216 or through some other part of messaging device 200, for example via manipulandum 214 or housing 202.

In the embodiment shown in FIG. 2, display 216 comprises a textured ball 204. When the user interacts with textured ball 204, the processor will determine a haptic effect that will simulate the texture of textured ball 204 on the surface of display 216. For example, textured ball may comprise the texture of sand. In such an embodiment, the processor may determine a haptic effect simulating the rough gritty feel of sand. In some embodiments, the processor may modify this haptic effect as users moves their fingers over the surface of textured ball 204, in order to simulate the texture of movement over sand.

Figures 3A, 3B:
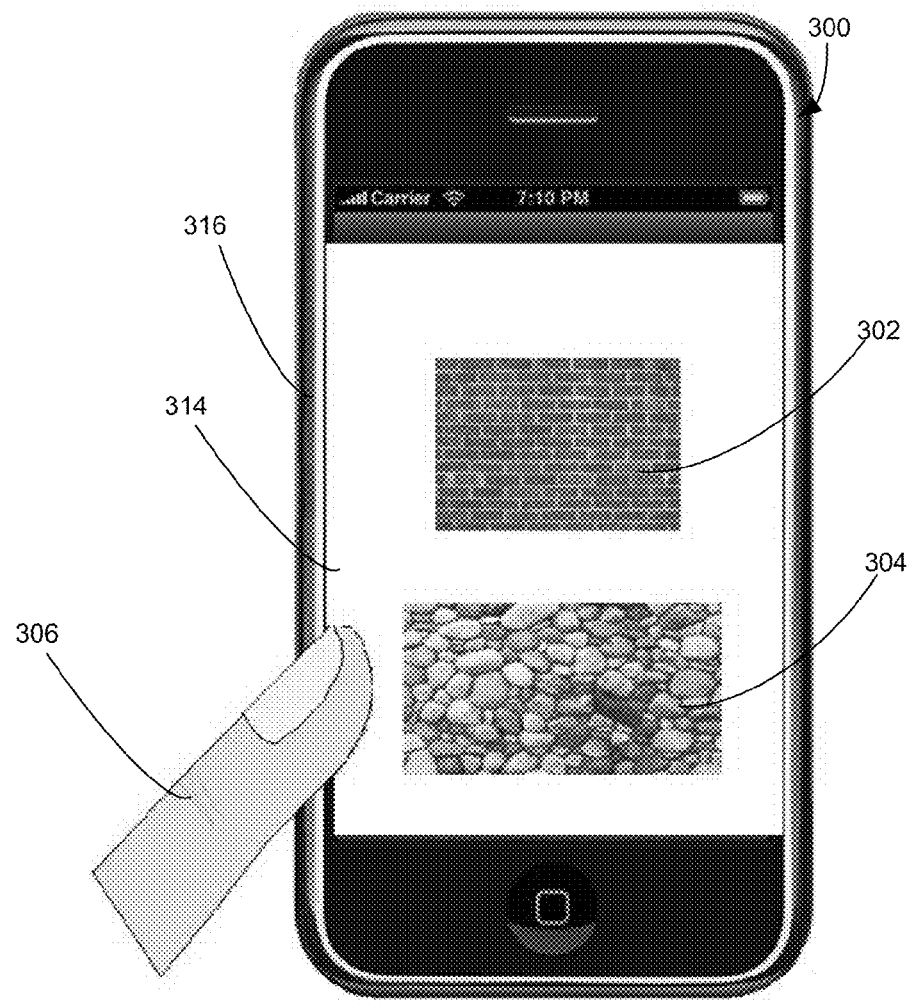
FIG. 3A is an illustration of a system for using textures in graphical user interface widgets according to one embodiment of the present invention.
FIG. 3b is an illustration of a system for using textures in graphical user interface widgets according to one embodiment of the present invention.

FIG. 3a is an illustration of a system for using textures in graphical user interface widgets according to one embodiment of the present invention. FIG. 3a comprises a messaging device 300, such as a mobile phone, PDA, portable media player, portable gaming device, or mobile computer. The messaging device 300 is configured to send and receive signals comprising messages, such as voicemail, text messages, and other data messages, over a network such as a cellular network or the Internet. The messaging device 300 may comprise a wireless network interface and/or a wired network interface (not shown in FIG. 3a). Although the device 300 is illustrated as a handheld messaging device in FIG. 3a, other embodiments may comprise different devices, such as video game systems and/or personal computers.

As shown in FIG. 3a, messaging device 300 comprises a display 316. Display 316 is configured to receive a display signal, and output an image based at least in part on the display signal. Messaging device 300 further compromises a processor (not shown in FIG. 3a) configured to transmit the display signal to display 316. Messaging device 300 further comprises a touch-sensitive interface 314 mounted overtop of display 316. Touch-sensitive interface 314 is configured to detect a user interaction and transmit an interface signal corresponding to the user interaction to the processor. Display 316 comprises two icons 302 and 304. When the user interacts with one of icons 302 and 304, touch-sensitive interface 314 will detect the user interaction and transmit a corresponding interface signal to the processor. Based on this interface signal, the processor may determine that the user has opened a file linked to one of the icons or performed some other action known in the art.

As shown in FIG. 3a, each of icons 302 and 304 comprises a texture. In the embodiment shown, icon 302 comprises the texture of bricks and icon 304 comprises the texture of rocks. In other embodiments, different textures may be used, for example, the texture of sand, water, oil, grass, fur, skin, leather, ice, wood, or some other texture known in the art. When the user, shown in FIG. 3a as finger 306, interacts with the section of display 316 associated with each icon, the processor will determine a haptic effect configured to simulate the texture of that icon. The processor will then output a signal associated with the haptic effect to an actuator (not shown in FIG. 3a) configured to output the haptic effect. For example, in the embodiment shown in FIG. 3a, when the user interacts with the section of the display associated with the icon 302 the processor will determine a haptic effect associated with the texture of bricks. This haptic effect may be characterized by a random signal punctuated with high powered pulses as user's finger 306 moves across mortar. In other embodiments, other haptic effects may be used to simulate different textures that may correspond to the image shown on display 316.

FIG. 3b is an illustration of a system for using textures in graphical user interface widgets according to one embodiment of the present invention. In the embodiment shown in FIG. 3b, determining the haptic effect comprises mapping the display signal to the actuator. The embodiment shown in FIG. 3b, comprises a magnified section of a display 350. Display 350 is configured to receive a display signal from the processor. The display signal comprises a plurality of pixels that are each associated with a color and an intensity of that color. Display 350 receives this display signal and outputs an image associated with the display signal. In the embodiment shown in FIG. 3b, the magnified portion of display 350 comprises six pixels: 351, 352, 353, 354, 355, and 356. Each pixel is associated with a color and an intensity for that color ranging from 1-10. For example, pixel 355 is associated with the color green, and the color intensity 3 out of 10. Thus, the display 350 will output the color green at an intensity of 3 at the location of pixel 355.

In the embodiment shown in FIG. 3b, the processor will determine the haptic effect based at least in part on the display signal and an interface signal received from a touch-sensitive interface mounted overtop of display 350 (not shown in FIG. 3b). For example, in the embodiment shown in FIG. 3b, the processor uses the display signal to associate, or "map," a haptic effect with each pixel. For example, in the embodiment shown in FIG. 3b, the processor may determine a different frequency haptic effect for each color. The processor may further associate the intensity of the haptic effect at each pixel with the intensity of the color at each pixel. For example, the processor may determine that a pixel with a color intensity of 8 will also have a haptic intensity of 8. When the processor receives an interface signal associated with user interaction overtop of the pixels on the display, the processor will output a haptic signal associated with the pixels the user is interacting with. This haptic effect is configured to cause the user to feel a texture on the surface of the display.

For example, in the embodiment shown in FIG. 3b, the processor may determine blue pixels are associated with a knocking haptic effect, red pixels are associated with a pulsing vibration, and green pixels are associated with a clicking haptic effect. In such an embodiment, when the touch-sensitive interface detects that the user's finger has passed over pixel 351, the processor will determine a knocking with an intensity of 1. Then as the user's finger moves over pixel 352, the processor will determine a pulsing vibration with an intensity of 5. And as the user's finger continues to move across display 350 to pixel 353, the processor may determine a clicking effect with an intensity of 3.

These haptic effects are configured to cause the user to feel a texture on the surface of display 350 as the user moves his/her finger over its surface. In some embodiments, the messaging device may comprise multiple actuators. In such an embodiment, the processor may be configured to determine which actuator to output the haptic signal to. For example, in one embodiment a messaging device may comprise two actuators configured to output different intensity haptic effects. In such an embodiment, the processor may determine that all haptic effects with an intensity of less than 3 should be output by the first actuator, and all haptic effects with an intensity of greater than or equal to 3 should be output by a second actuator. In other embodiments, each color may be mapped to a specific actuator. For example, in such an embodiment all haptic effects associated with the color blue may be output by a first actuator, all haptic effects associated with the color red may be output by a second actuator, and all haptic effects associated with the color green may be output by a third actuator. In other embodiments, the messaging device may implement different combinations of colors, intensities, haptic effects, and actuators to simulate various textures on the surface of the display.

Method for Using Textures in Graphical User Interface Widgets

Figure 4:
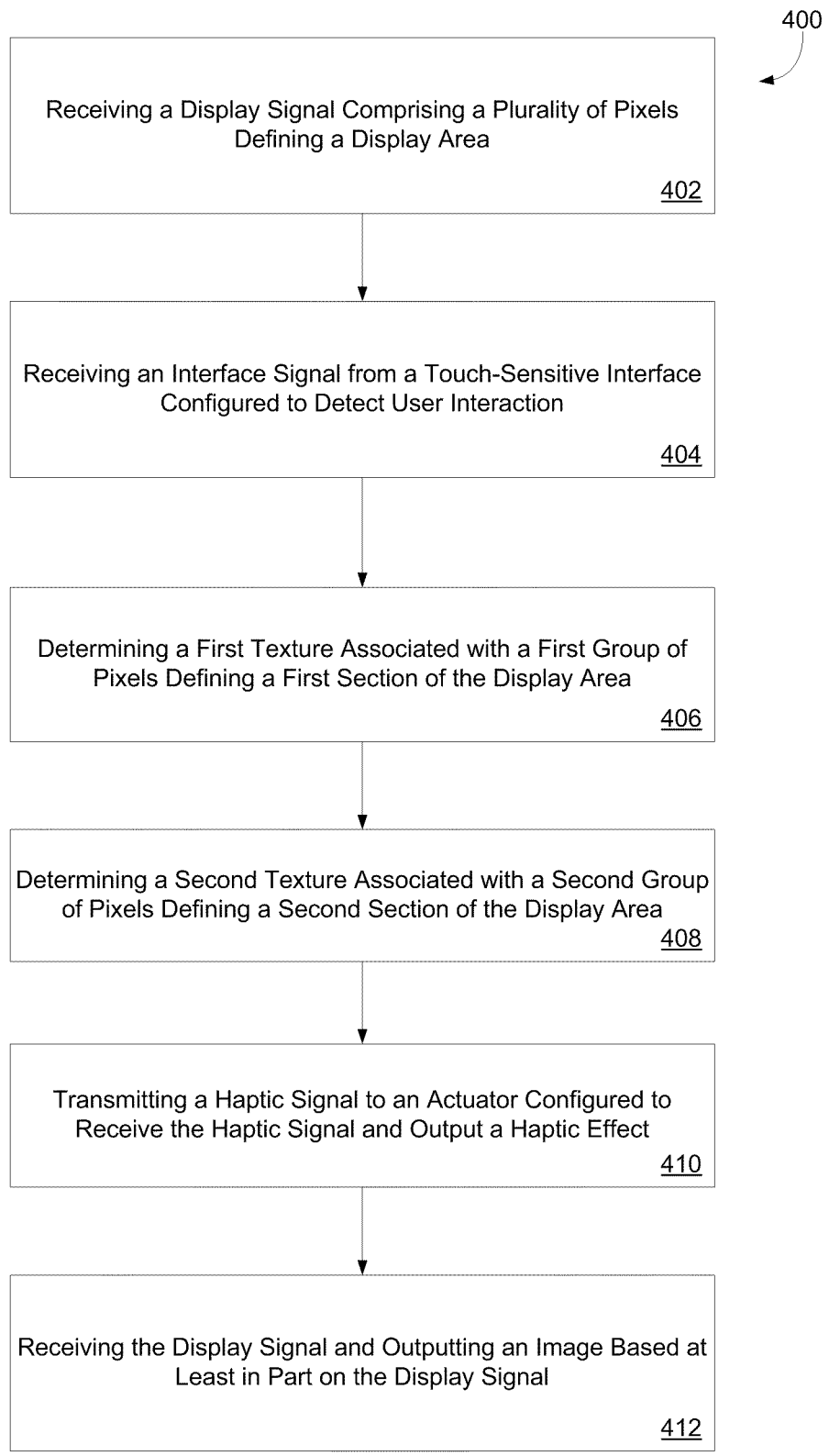
FIG. 4 is a flowchart for a method for using textures in graphical user interface widgets according to one embodiment of the present invention.

FIG. 4 is a flow chart of a method for using textures in graphical user interface widgets according to one embodiment of the present invention, which is discussed with respect to the device shown in FIG. 1. As shown in FIG. 4, the method 400 begins when processor 110 receives a display signal comprising a plurality of pixels defining a display area 402. The display signal may comprise a vga, hdmi, svga, video, s-video, or other type of display signal known in the art. The display signal may comprise a graphical user interface, or other image that the messaging device will display to the user via display 116. In some embodiments, the display area may comprise a standard display size known in the art, for example 480 pixels by 320 pixels. In other embodiments, the display area may be larger or smaller.

Then, touch-sensitive interface 114 transmits an interface signal to processor 110, which receives the interface signal 404. In some embodiments, touch-sensitive interface 114 may comprise a touch-screen or a touch-pad. For example, in some embodiments, touch-sensitive interface 114 may comprise a touch-screen mounted overtop of a display configured to receive a display signal and output an image to the user. In other embodiments, touch-sensitive interface 114 may comprise a button, switch, mouse, scroll wheel, roller ball, or some other type of physical device interface known in the art. In some embodiments, processor 110 is in communication with a single touch-sensitive interface 114. In other embodiments, processor 110 is in communication with a plurality of touch-sensitive interfaces 114, for example, a touch-screen and a roller ball. Touch-sensitive interface 114 is configured to detect user interaction, and based on the user interaction, transmit signals to processor 110. In some embodiments, touch-sensitive interface 114 may be configured to detect multiple aspects of the user interaction. For example, touch-sensitive interface 114 may detect the speed and pressure of a user interaction and incorporate this information into the interface signal. In some embodiments, touch-sensitive interface 114 is capable of detecting multi-touch.

Next, processor 110 determines a first texture associated with a first group of pixels defining a first section of the display area 406. The section of the display area defined by the first group of pixels may define an object in a graphical user interface, for example text, figures, or an icon. In some embodiments, the processor 110 will determine a texture associated with the characteristics of the object. For example, if the object comprises text, processor 110 may determine a course texture for tall letters such as "l" and a softer texture for shorter letters such as "o." In another embodiment, processor 110 may determine a texture based on the contents of a file associated with the icon. For example, processor 110 may determine a course texture for a file that contains more than a user defined amount of data, and a softer texture for a file that contains less than that amount. The first texture may comprise one of many textures known in the art, for example, the texture of steel, ice, fur, skin, leather, sand, sandpaper, rocks, snow, water, or oil. Or, in some embodiments, processor 110 may determine that the first texture comprises no texture.

Then, processor 110 determines a second texture associated with a second group of pixels defining a second section of the display area 408. In some embodiments, the second section of the display area may comprise all of the display area not occupied by the first section of the display area. In other embodiments, the second section of the display area may comprise a specific object in the graphical user interface, for example, text, figures, or an icon. In yet other embodiments, the second section may comprise some subset of the area not occupied by the first section. In some embodiments, the processor 110 will determine that the second texture is associated with the characteristics of the object. The second texture may comprise one of many textures known in the art, for example, the texture of steel, ice, fur, skin, leather, sand, sandpaper, rocks, snow, water, or oil. In some embodiments, processor 110 may determine that the second texture is similar or identical to the first texture. Or, in some embodiments, processor 110 may determine that the second texture comprises no texture.

In some embodiments, processor 110 may implement a haptic map to determine the first and second haptic effects. In such an embodiment, processor 110 may map the display signal to one or more actuators. In some embodiments, mapping the display signal to an actuator comprises determining haptic effects at various locations on the display, based at least in part on the display signal. For example, the display signal may comprise a plurality of pixels, each of the pixels associated with a color. In such an embodiment, processor 110 may determine the haptic effect by assigning a haptic value to each color in the display signal. Then processor 110 will determine a haptic effect based, at least in part, on the haptic values. In some embodiments, processor 110 may assign a haptic value to only some of the pixels in the display signal. For example, in such an embodiment, the haptic effect may be associated with only a portion of the display signal.

In some embodiments, processor 110 may determine the first haptic effect and the second haptic effect based, at least in part on, a user interaction or trigger. In such an embodiment, processor 110 receives an interface signal from touch-sensitive interface 114, and determines the haptic effect based at least in part on the interface signal. For example, in some embodiments, processor 110 may determine a different intensity haptic effect based on the interface signal received from touch-sensitive interface 114. For example, if touch-sensitive interface 114 detects a high pressure user interaction, processor 110 may determine a high-intensity haptic effect. In another embodiment, if touch-sensitive interface 114 detects a low pressure user interaction, processor 110 may determine a low-intensity haptic effect.

Next processor 110 transmits a haptic signal to an actuator 118 configured to receive the haptic signal and output a haptic effect 410. Actuator 118 may be, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA). The haptic effect may comprise one of several haptic effects known in the art, for example, vibrations, knocking, buzzing, jolting, or torquing the messaging device. In some embodiments, the haptic signal is configured to cause actuator 118 to output a haptic effect that simulates a texture. In some embodiments, if processor 110 determines that the user interaction is associated with the first section of the display area, the texture will comprise the first texture. In other embodiments, if processor 110 determines that the user interaction is associated with the second section of the display area, the texture will comprise the second texture. In some embodiments, processor 110 may determine the location of the user interaction based at least in part in the interface signal received from touch-sensitive interface 114. In other embodiments, processor 110 may determine the location of the user interaction based on another factor, for example a sensor signal received from a sensor or manipulandum such as a mouse, scroll wheel, or roller ball.

Finally, display 116 receives the display signal and outputs an image based at least in part on the display signal. In some embodiments, display 116 comprises a flat-screen display, such as a Liquid Crystal Display (LCD) or Plasma Screen Display. In other embodiments display 116 comprises a Cathode Ray Tube (CRT) or other type of display known in the art. In still other embodiments, display 116 may comprise touch-sensitive interface 114, for example, display 116 may comprise a touch-screen LCD. In some embodiments, processor 110 is configured to generate a graphical representation of a user interface to be shown on display 116, then transmit a display signal comprising the graphical representation to display 116. In other embodiments, display 116 is configured to receive a display signal from another device. For example, in some embodiments, display 116 may comprise an external display such as a computer monitor.

Figure 5:
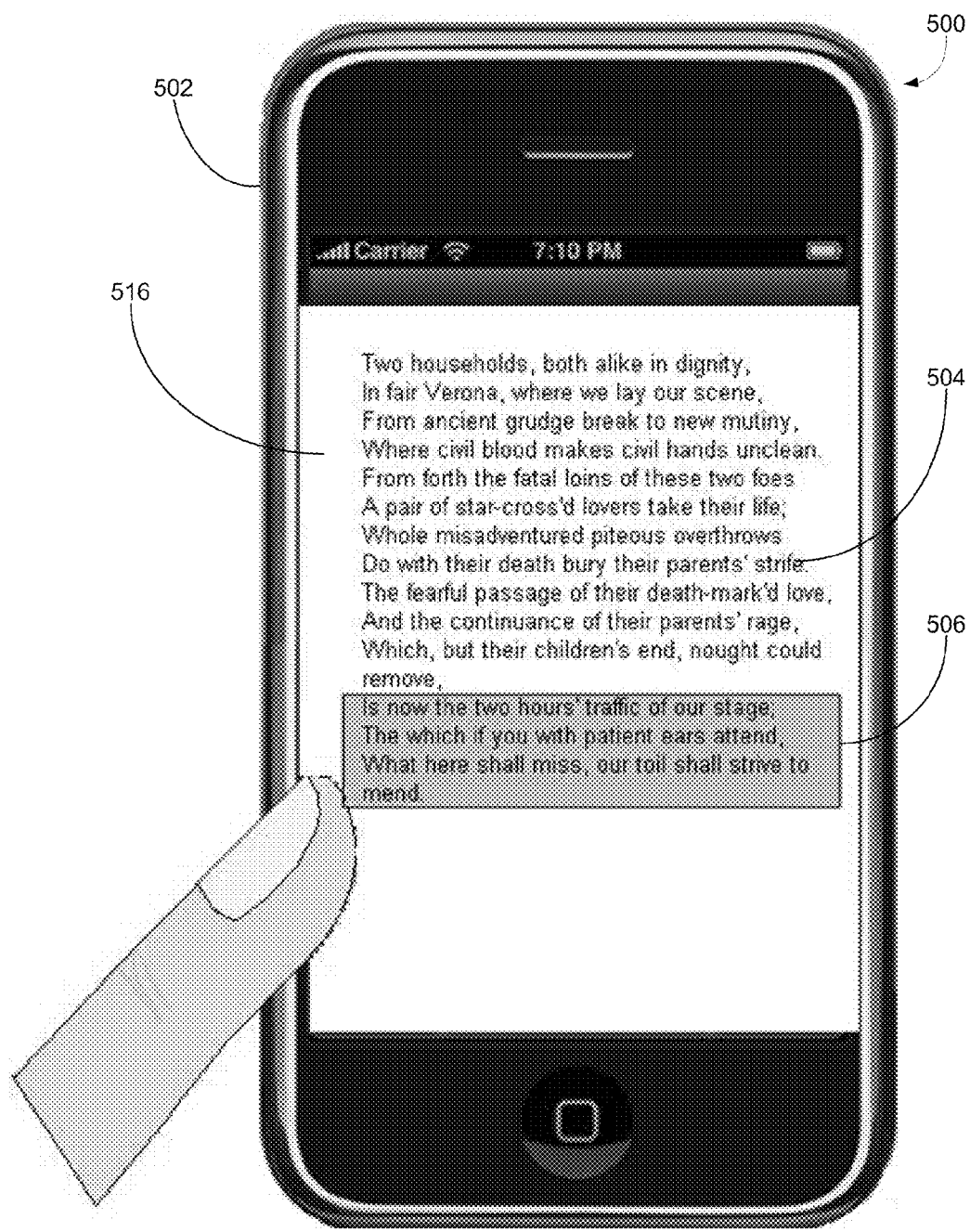
FIG. 5 is an illustration of a system for using textures in graphical user interface widgets according to one embodiment of the present invention.

Illustrations of Various Embodiments Using Textures in Graphical User Interface Widgets FIG. 5 is an illustration of a system for using textures in graphical user interface widgets according to one embodiment of the present invention. FIG. 5 comprises a system 500, which comprises messaging device 502. Messaging device 502 comprises a display 516. Display 516 is configured to display a graphical user interface to the user. Further, a touch-sensitive interface, which is configured to detect user interaction is mounted overtop of display 516. The touch-sensitive interface allows the user to interact with the graphical user interface shown in display 516, for example allowing the user to enter text, select objects, or perform other operations known in the art. In the embodiment shown in FIG. 5, system 500 comprises a handheld device. In other embodiments, system 500 may comprise a larger device, such as a laptop or desktop computer, or a display in a kiosk. In some embodiments (not shown in FIG. 5), system 500 may further comprise a manipulandum, such as a mouse, scroll wheel, or roller ball, which allows the user to interact with the graphical user interface on display 516.

As shown in FIG. 5, display 516 displays text 504. Display 516 further displays a selection box 506 over a portion of the text 504, which indicates that the user has selected the portion of text 506 within text 504. In some embodiments, the user may have highlighted the text in selection box 506, for example, by tapping the section of display 516 associated with the text. In other embodiments, a text editing program may have automatically highlighted the text in box 506, for example as a part of a track changes function. In such an embodiment, selection box 506 may comprise the user's edits to an existing text file.

Messaging device 502 further comprises an actuator (not shown in FIG. 5) configured to output a haptic effect configured to simulate a texture. In some embodiments, the user may feel the texture on the housing of device 502. In other embodiments, the user can feel the texture on the surface of display 516. For example, in some embodiments, when the user touches the section of display 516 associated with selection box 506 the actuator may output a haptic effect configured to simulate a texture. Further, in such an embodiment, the actuator may be configured to output a haptic effect simulating a different texture when the user touches a section of display 516 that is not associated with selection box 506. For example, when the user interacts with selection box 506, the actuator may output a haptic effect simulating the texture of sand. Further, when the user interacts with the remainder of display 516, the actuator may output a haptic effect simulating the texture of water. In other embodiments, the actuator may output haptic effects configured to simulate different textures. In some embodiments, the user may assign a texture to be associated with selection box 506 and another texture to be associated with the remainder of display 516.

In some embodiments, the texture may be associated with the text within selection box 506. For example, in some embodiments, the actuator may output a course texture when the user interacts with tall letters such as "l" and a soft texture when the user interacts with short letters such as "a." In another embodiment, the actuator may output a course texture when the user interacts with uppercase letters and a softer texture when the user interacts with lowercase letters. In still other embodiments, the texture may be associated with other factors, for example, font, font size, length of the text, or length of individual words.

In some embodiments, messaging device 502 may comprise more than one actuator. In such an embodiment, these actuators may be used in combination to generate haptic effects. For example, when the haptic effects of each actuator are combined, they may form a single haptic effect that simulates a texture. In other embodiments, messaging device 502 may use the actuators separately. For example, a first actuator may output a first haptic effect when the user interacts with the section of display 516 associated with selection box 506, and a second actuator may output a second haptic effect when the user interacts with the remainder of display 516.

Figure 6:
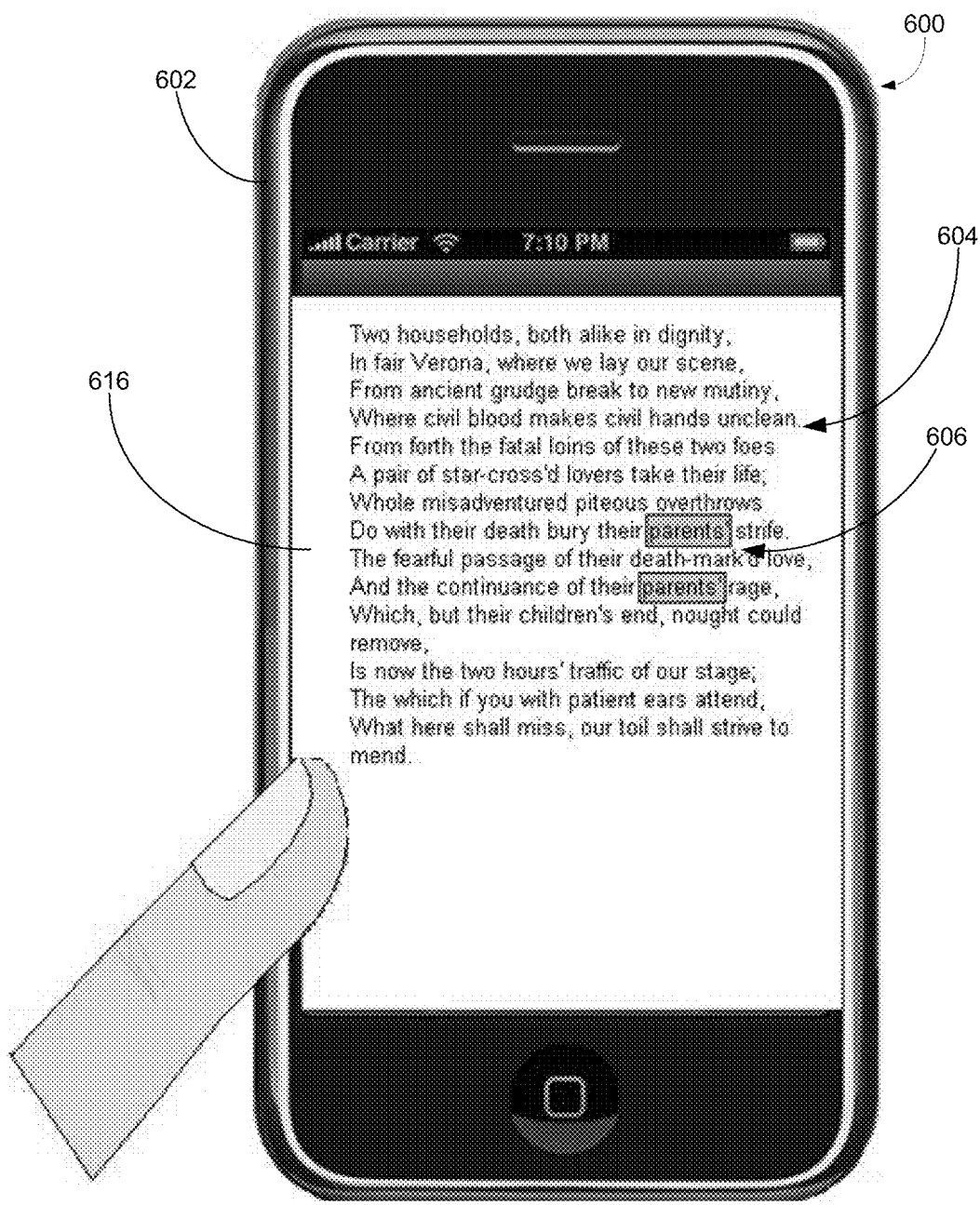
FIG. 6 is another illustration of a system for using textures in graphical user interface widgets according to one embodiment of the present invention.

FIG. 6 is an illustration of a system for using textures in graphical user interface widgets according to one embodiment of the present invention. FIG. 6 comprises a system 600, which is similar to system 500 above. As shown in FIG. 6, messaging device 602 comprises a display 616 positioned underneath a touch-sensitive interface. In some embodiments (not shown in FIG. 6), system 600 may further comprise a manipulandum, such as a mouse, scroll wheel, or roller ball, which allows the user to interact with the graphical user interface on display 616.

As shown in FIG. 6, display 616 comprises text 604. Display 616 further comprises highlighted text 606, which in the embodiment shown in FIG. 6, comprises two instances of the word "parents." In some embodiments, the user may select text to be highlighted, for example by tapping the location of display 616 associated with that text. In other embodiments, a text editing program may have automatically highlighted 606, for example as a part of a search function of the text editing program. In such an embodiment, highlighted text 606 may comprise every instance of a search term in the text file.

Messaging device 602 further comprises an actuator (not shown in FIG. 6) configured to output a haptic effect configured to simulate a texture. In some embodiments, the user can feel this texture on the surface of display 616. For example, in some embodiments, when the user touches the section of display 616 associated with highlighted text 606, the actuator may output a haptic effect configured to simulate a texture. Further, in such an embodiment, the actuator may be configured to output a haptic effect simulating a different texture when the user touches a section of display 616 that is not associated with highlighted text 606. For example, when the user interacts with highlighted text 606, the actuator may output a haptic effect simulating the texture of grass. Further, when the user interacts with the remainder of display 616, the actuator may output a haptic effect simulating the texture of ice. Such an embodiment may enable the user to quickly determine all the locations of a search teen within a document, without looking at the document. In other embodiments, the actuator may output haptic effects configured to simulate different textures. In some embodiments, the user may assign a texture to be associated with highlighted text 606 and another texture to be associated with the remainder of display 616. In some embodiments, messaging device 602 may comprise more than one actuator, as described herein in relation to system 500.

Figure 7:
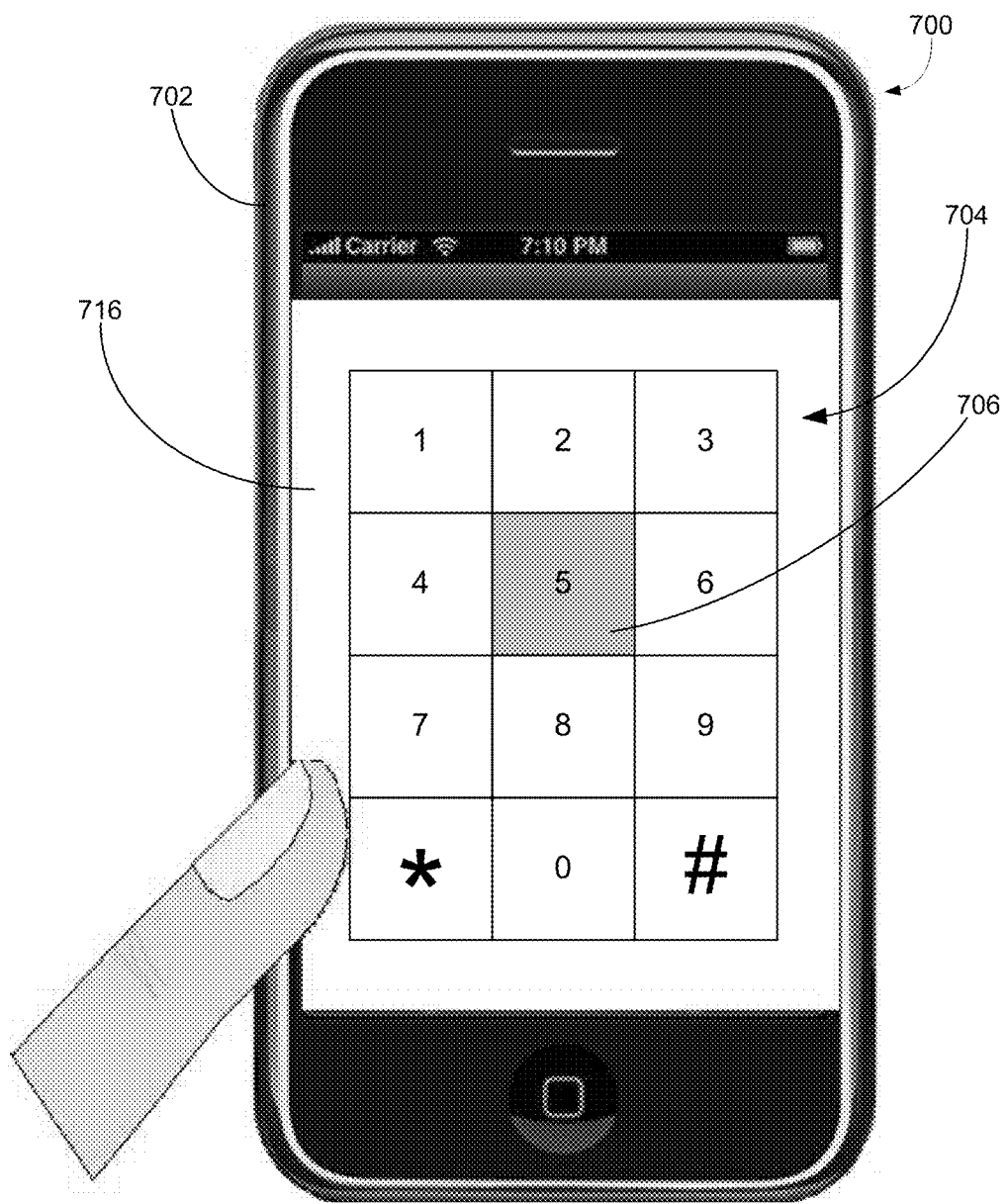
FIG. 7 is another illustration of a system for using textures in graphical user interface widgets according to one embodiment of the present invention.

FIG. 7 is an illustration of a system for using textures in graphical user interface widgets according to one embodiment of the present invention. FIG. 7 comprises a system 700, which is similar to system 500 above. As shown in FIG. 7, messaging device 702 comprises a display 716 positioned underneath a touch-sensitive interface. In some embodiments (not shown in FIG. 7), system 700 may further comprise a manipulandum, such as a mouse, scroll wheel, or roller ball, which allows the user to interact with the graphical user interface on display 716.

As shown in FIG. 7, display 716 comprises numeric keypad 704. Within numeric keypad 704 is texture key 706, which in the embodiment shown in FIG. 7 is the number 5. In other embodiments, a different key may comprise texture key 706, for example, the user may assign any key to be the texture key. Further in other embodiments, numeric keypad 704 may comprise a different type of keypad, for example a QWERTY keyboard, or some other keyboard known in the art.

Messaging device 702 further comprises an actuator (not shown in FIG. 7) configured to output a haptic effect configured to simulate a texture. In some embodiments, the user can feel this texture on the surface of display 716. For example, in some embodiments, when the user touches the section of display 716 associated with texture key 706 the actuator may output a haptic effect configured to simulate a texture. In such an embodiment, the actuator may not output a texture when the user touches other sections of the numeric keypad 704. In other embodiments, the actuator may be configured to output a different texture when the user interacts with the other sections of numeric keypad 704, but output no texture when the user interacts with other sections of display 716. Such an embodiment may allow the user to quickly determine his/her finger's location on numeric keypad 704, without looking at display 716.

In some embodiments, messaging device 702 may be configured to output more complex haptic effects configured to simulate unique textures associated with each key on numeric keypad 704. For example, in some embodiments, messaging device 702 may output haptic effects configured to simulate edges for each key on numeric keypad 704. In some embodiments, these haptic effects may comprise vibrations that simulate four edges on each key. In some embodiments, the haptic effects may be further configured to simulate a depth or surface feature for each key. In one embodiment, the haptic effect may be configured to simulate keys that are not perfectly flat, for example keys that are slightly concave. This functionality may enable the user to distinguish one key from another, and may further allow the user to distinguish the center of a key from the edge of a key. In some embodiments, similar functionality may be applied to simulate textures on a larger keyboard, for example, a full QWERTY keyboard. In some embodiments, messaging device 702 may comprise more than one actuator, as described herein in relation to system 500.

Figure 8:
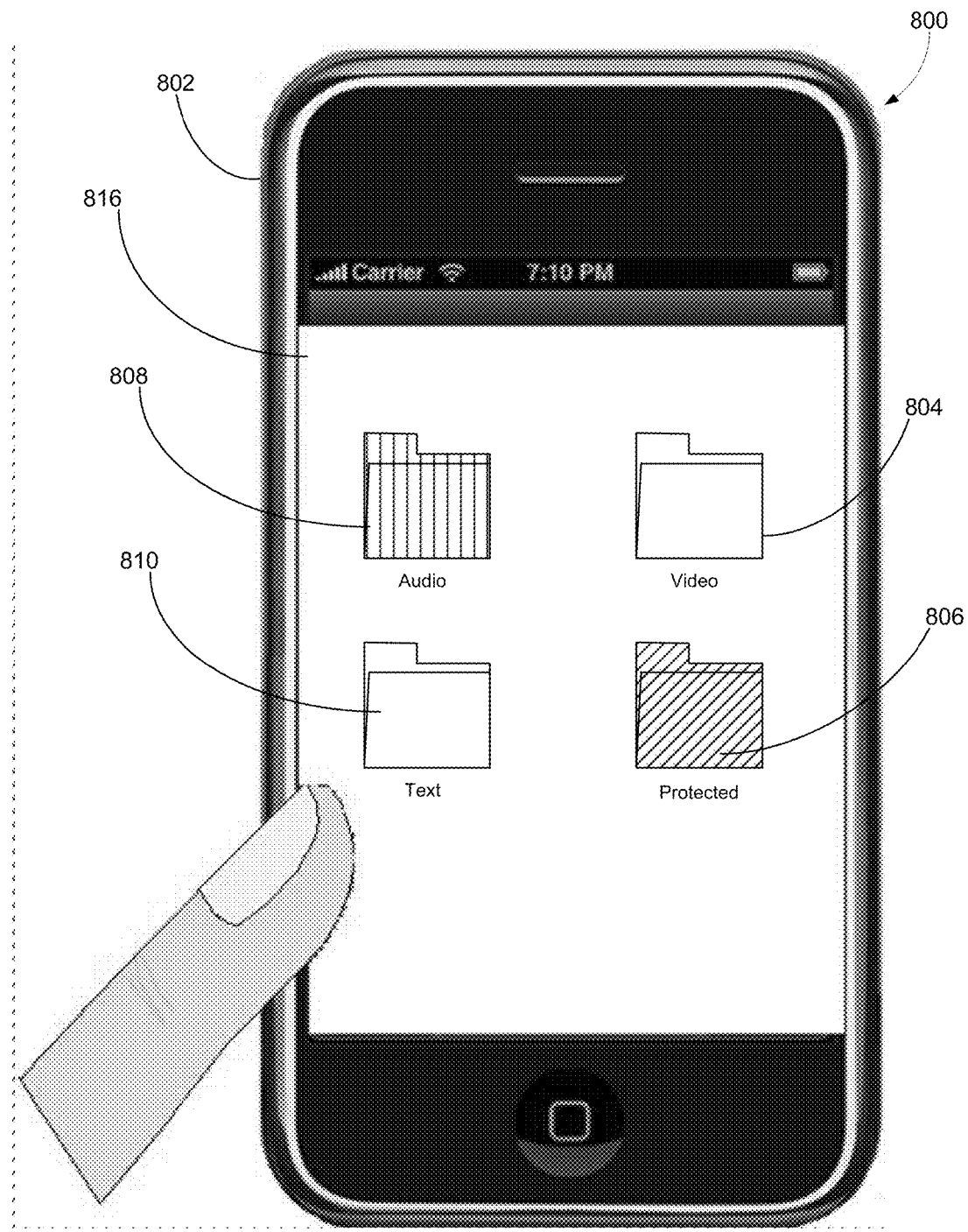
FIG. 8 is another illustration of a system for using textures in graphical user interface widgets according to one embodiment of the present invention.

FIG. 8 is an illustration of a system for using textures in graphical user interface widgets according to one embodiment of the present invention. FIG. 8 comprises a system 800, which is similar to system 500 above. As shown in FIG. 8, messaging device 802 comprises a display 816 positioned underneath a touch-sensitive interface. In some embodiments (not shown in FIG. 8), system 800 may further comprise a manipulandum, such as a mouse, scroll wheel, or roller ball, which allows the user to interact with the graphical user interface on display 816.

As shown in FIG. 8, display 816 comprises folders 804, 806, 808, and 810, each of which contains files on messaging device 802's hard drive. As shown in FIG. 8, folders 806 and 808 both comprise a texture, while folder 804 and 810 do not comprise a texture. In some embodiments, the user may create additional folders and assign textures to those folders. In other embodiments, the user may remove folders. Thus, many combinations of folders, with or without textures, are possible. In some embodiments, folders 804, 806, 808, and 810 may comprise icons with links to applications that may be run on messaging device 802.

Messaging device 802 further comprises an actuator (not shown in FIG. 8) configured to output a haptic effect configured to simulate a texture. In some embodiments, the user can feel this texture on the surface of display 816. For example, in some embodiments, when the user touches the section of display 816 associated with folder 806 the actuator may output a haptic effect configured to simulate a texture. In such an embodiment, the actuator may not output a texture when the user touches the section of display 816 associated with folder 804. Further, in such an embodiment, when the user touches the section of display 816 associated with folder 808 the actuator may output a different haptic effect configured to simulate a different texture. In some embodiments, the actuator may be configured to output a different texture when the user interacts with the other sections of display 816 that are not associated with one of folders 804, 806, 808, or 810. Such an embodiment may allow the user to quickly determine which folder he/she is touching without looking at display 816.

In some embodiments, messaging device 802 may determine the texture based on the files associated with the folder. For example, in some embodiments, folder 808 may comprise audio files. In such an embodiment, messaging device 802 may determine the texture based on the type of audio files, for example a course texture if the files are hard rock, and a soft texture if the files are classical. In another example, messaging device may determine the texture based on the properties of the files in the folder. For example, folder 806 may comprise protected or read only files, while folder 808 may comprise modifiable audio files. In such an embodiment, messaging device 802 may determine a course texture when the user interacts with folder 806, and a gentle or soft texture when the user interacts with folder 808. In other embodiments, different factors associated with the folders may be used to determine the haptic effect, for example, folder size, contents of the folder, age of the folder, title of the folder, creator of the files or folder, or some other factor known in the art. In some embodiments, messaging device 802 may comprise more than one actuator, as described herein in relation to system 500.

Figure 9:
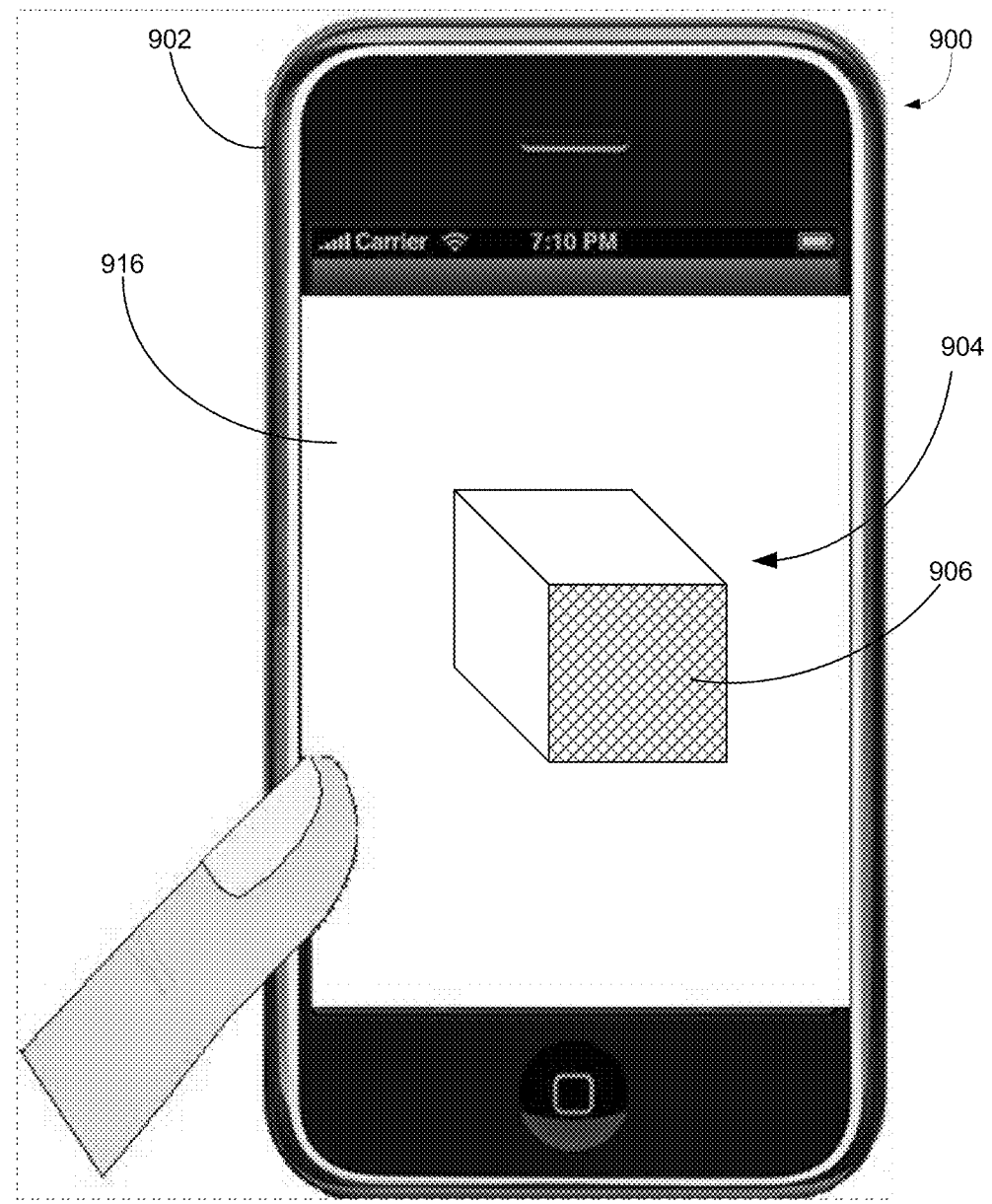
FIG. 9 is another illustration of a system for using textures in graphical user interface widgets according to one embodiment of the present invention.

FIG. 9 is an illustration of a system for using textures in graphical user interface widgets according to one embodiment of the present invention. FIG. 9 comprises a system 900, which is similar to system 500 above. As shown in FIG. 9, messaging device 902 comprises a display 916 positioned underneath a touch-sensitive interface. In some embodiments (not shown in FIG. 9), system 900 may further comprise a manipulandum, such as a mouse, scroll wheel, or roller ball, which allows the user to interact with the graphical user interface on display 916.

As shown in FIG. 9, display 916 comprises a two-dimensional rendering of a three-dimensional object 904. One side of three dimension object 904 comprises a textured side 906. In other embodiments, three-dimensional object 904 may comprise a different shape. In some embodiments, the user may draw an object with a different shape in a computer aided design program, for example a sphere or a triangle. Further, in other embodiments the user may assign textures to additional sides of three-dimension object 904. In still other embodiments, display 916 may comprise multiple three-dimensional objects with multiple combinations of textured sides. For example, in some embodiments, display 916 may comprise multiple views of three-dimensional object 904. In such an embodiment, each of the views may comprise a different texture.

Messaging device 902 further comprises an actuator (not shown in FIG. 9) configured to output a haptic effect configured to simulate a texture. In some embodiments, the user can feel this texture on the surface of display 916. For example, in some embodiments, when the user touches the section of display 916 associated with textured side 906 the actuator may output a haptic effect configured to simulate a texture. In such an embodiment, the actuator may not output a texture when the user touches other sections of three-dimensional object 904. In other embodiments, the actuator may be configured to output a different texture when the user interacts with sections of display 916 that are not associated with three-dimensional object 904. In still other embodiments, messaging device 902 may output a texture when the user rotates or moves three-dimensional object 904. Such an embodiment may allow the user to quickly determine which view of three-dimensional object 904 is shown on display 916, without looking at display 916. In some embodiments, messaging device 902 may comprise more than one actuator, as described herein in relation to system 500.

Figure 10:
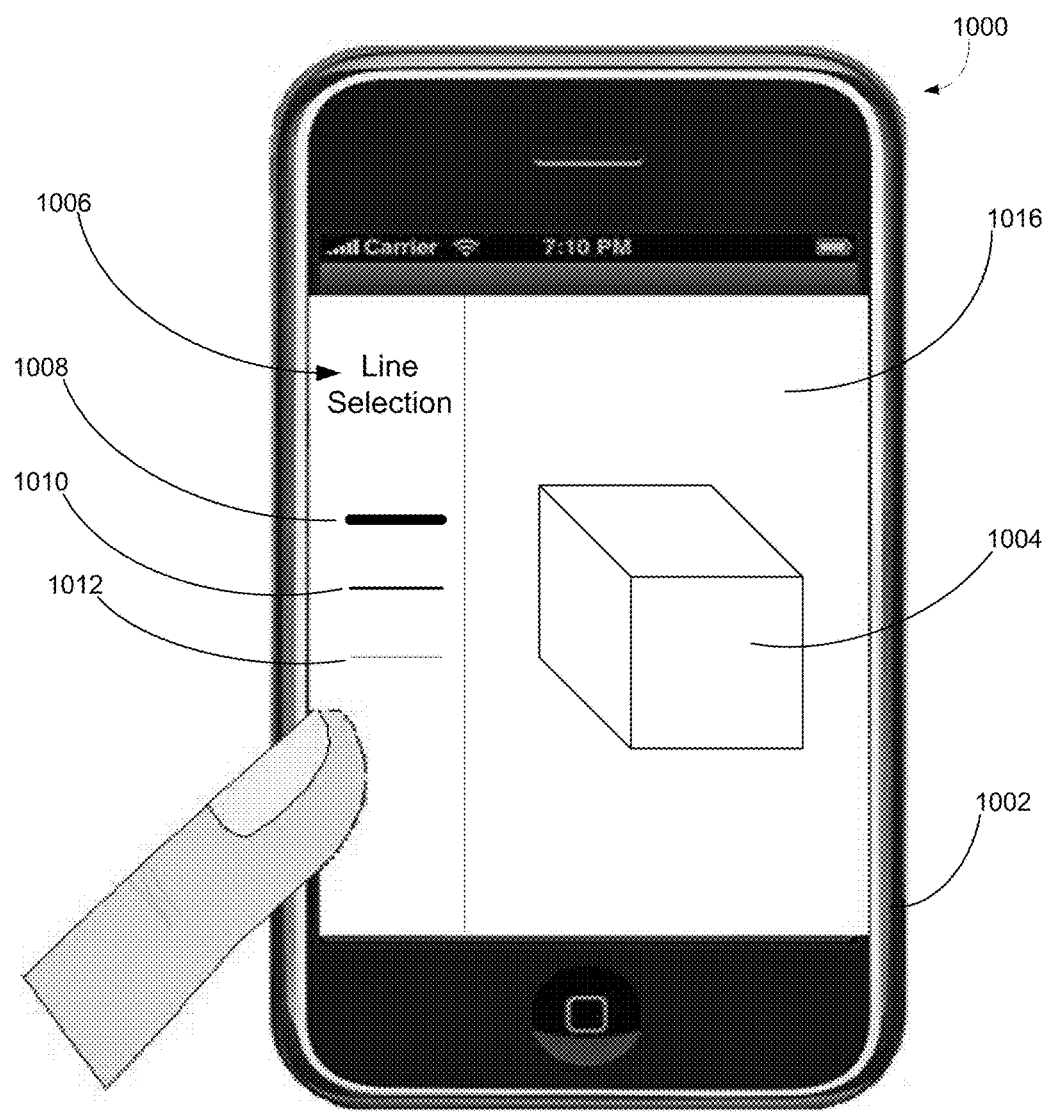
FIG. 10 is another illustration of a system for using textures in graphical user interface widgets according to one embodiment of the present invention.

FIG. 10 is an illustration of a system for using textures in graphical user interface widgets according to one embodiment of the present invention. FIG. 10 comprises a system 1000, which is similar to system 500 above. As shown in FIG. 10, messaging device 1002 comprises a display 1016 positioned underneath a touch-sensitive interface. In some embodiments (not shown in FIG. 10), system 1000 may further comprise a manipulandum, such as a mouse, scroll wheel, or roller ball, which allows the user to interact with the graphical user interface on display 1016.

As shown in FIG. 10, display 1016 comprises a graphical user interface for a simple computer aided design program. Display 1016 further comprises a two-dimensional rendering of a three-dimensional object 1004. Display 1016 further comprises a line selection box 1006. Line selection box 1006 comprises three line icons 1008, 1010, and 1012, which are of increasing line thickness. In other embodiments, three-dimensional object 1004 may comprise a different shape. For example, the user may draw an object of a different shape, such as a sphere or a parallelogram. Further, in other embodiments, rather than a line selection box 1006, the computer aided design program may comprise a different box configured to control different functionality, for example, a shape selection box, a text entry box, a hatching selection box, or a box configured to modify some other feature known in the art.

Messaging device 1002 further comprises an actuator (not shown in FIG. 10) configured to output a haptic effect configured to simulate a texture. In some embodiments, the user can feel this texture on the surface of display 1016. For example, in some embodiments, when the user touches the section of display 1016 associated line selection box 1006 the actuator may output a haptic effect configured to simulate a texture. In some embodiments, messaging device 1002 may output a haptic effect configured to simulate a texture associated with the thickness of the line the user selects, for example, a course texture for thick line 1008 and a soft texture for thin line 1012. In some embodiments, messaging device 1002 may output the haptic effect while the user draws the object. In other embodiments, messaging device 1002 may output the haptic effect only when the user selects the line. In still other embodiments, messaging device 1002 may output a haptic effect when the user interacts with three-dimensional object 1004, and output no haptic effect when the user interacts with other sections of display 1016. In some embodiments, messaging device 1002 may comprise more than one actuator, as described herein in relation to system 500.

Figure 11:
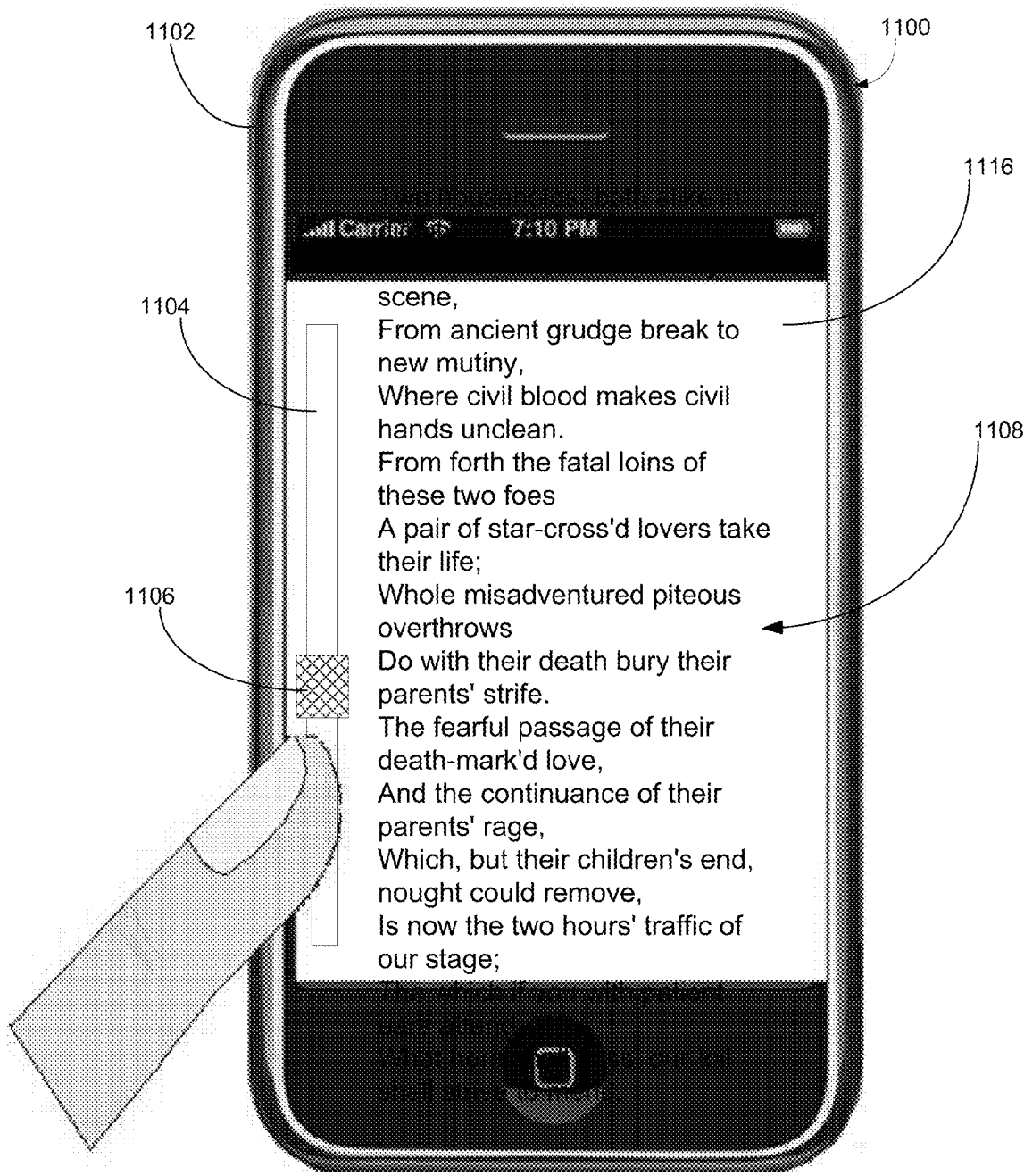
FIG. 11 is another illustration of a system for using textures in graphical user interface widgets according to one embodiment of the present invention.

FIG. 11 is an illustration of a system for using textures in graphical user interface widgets according to one embodiment of the present invention. FIG. 11 comprises a system 1100, which is similar to system 500 above. As shown in FIG. 11, messaging device 1102 comprises a display 1116 positioned underneath a touch-sensitive interface. In some embodiments (not shown in FIG. 11), system 1100 may further comprise a manipulandum, such as a mouse, scroll wheel, or roller ball, which allows the user to interact with the graphical user interface on display 1116.

As shown in FIG. 11, display 1116 comprises an interface for reading a text file, which comprises a scrollbar track 1104, scrollbar 1106, and text 1108. In the embodiment shown in FIG. 11, the user may move scrollbar 1106 up or down along scrollbar track 1104 in order to scroll to different sections of text 1108. In some embodiments, the user may tap a section of scrollbar track 1104 in order to move scrollbar 1106 and text 1108 to the section associated with that point on scrollbar track 1104. In other embodiments, scrollbar track 1104 and scrollbar 1106 may comprise a different appearance or perform a different function. For example, in some embodiments, scrollbar track 1104 and scrollbar 1106 may be positioned on the top or bottom of display 1116 and allow the user to move the display horizontally. In further embodiments, scrollbar track 1104 and scrollbar 1106 may be used to control different types of user interfaces, for example drawing applications, web browsing applications, email applications, or some other application known in the art.

Messaging device 1102 further comprises an actuator (not shown in FIG. 11) configured to output a haptic effect configured to simulate a texture. In some embodiments, the user can feel this texture on the surface of display 1116. For example, in some embodiments, when the user touches the section of display 1116 associated with scrollbar 1106 the actuator may output a haptic effect configured to simulate a texture. In such an embodiment, the actuator may not output a different texture when the user touches a part of scrollbar track 1104. Further, in some embodiments, the actuator may output a texture that changes as the user moves scrollbar 1106 along scrollbar track 1104. For example, in some embodiments, the actuator may output a haptic effect configured to simulate a texture that becomes coarser as the user moves further down scrollbar track 1104. Such an embodiment may allow the user to quickly determine his/her finger's location on scrollbar track 1104, without looking at display 1106, or without being distracted from reading text 1108. In some embodiments, messaging device 1102 may comprise more than one actuator, as described herein in relation to system 500.

Figure 12:
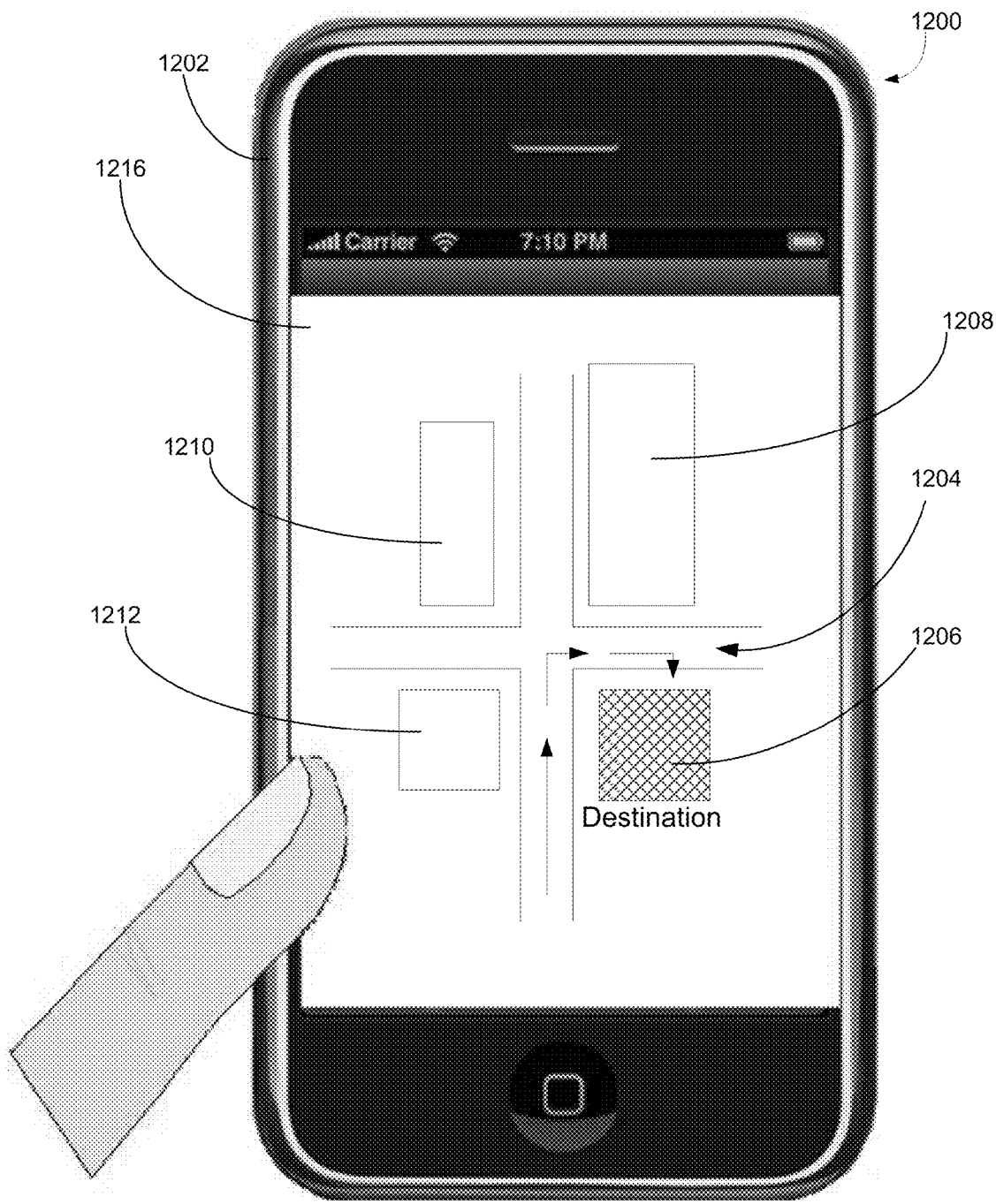
FIG. 12 is another illustration of a system for using textures in graphical user interface widgets according to one embodiment of the present invention.

FIG. 12 is an illustration of a system for using textures in graphical user interface widgets according to one embodiment of the present invention. FIG. 12 comprises a system 1200, which is similar to system 500 above. As shown in FIG. 12, messaging device 1202 comprises a display 1216 positioned underneath a touch-sensitive interface. In some embodiments (not shown in FIG. 12), system 1200 may further comprise a manipulandum, such as a mouse, scroll wheel, or roller ball, which allows the user to interact with the graphical user interface on display 1216.

As shown in FIG. 12, display 1216 comprises a graphical user interface for a mapping application or Global Positioning System (GPS) receiver. The graphical user interface comprises a route 1204, destination 1206, and several buildings 1208, 1210, and 1212 along or near the route 1204. In some embodiments, route 1204 may be much longer than shown in FIG. 5. For example, in some embodiments, route 1204 may require several screens to be shown in its entirety. Thus, it may be subdivided such that only a portion of route 1204 is shown at any one time. In further embodiments, waypoints and other items known in the art may be shown in the graphical user interface.

Messaging device 1202 further comprises an actuator (not shown in FIG. 12) configured to output a haptic effect configured to simulate a texture. In some embodiments, the user can feel this texture on the surface of display 1216. For example, in some embodiments, when the user touches the section of display 1216 associated with destination 1206 the actuator may output a haptic effect configured to simulate a texture. In such an embodiment, the actuator may not output a texture when the user touches other sections of display 1216. Thus, the texture may allow the user to quickly determine destination 1206's location on display 1216. In other embodiments, additional features of the graphical user interface may comprise a texture. For example, route 1204 may comprise a texture. In such an embodiment, the user may move his/her finger over the surface of display 1216, and feel a texture when a finger touches route 1204.

In still other embodiments, messaging device 1202 may automatically assign textures to other buildings along the user's route. For example, in some embodiments, the messaging device may automatically assign a texture to certain types of buildings, for example all gas stations, restaurants, or hospitals. In one embodiment, building 1208 may comprise a hospital, building 1210 may comprise a mall, and building 1212 may comprise a gas station. In such an embodiment, the user may search for a gas station. As a part of this search, the user may enter a search menu that allows the user to assign a texture to all gas stations along his/her route. Then, the user may run his/her finger over the surface of display 1216 to find a gas station. When the user touches display 1216, he/she will feel a texture on the section of display 1216 associated with building 1212 and know that it is a gas station. In other embodiments, different sections of the interface may be associated with a texture. For example, in one embodiment, one or more of the turns along route 1204 may be associated with a texture. In another embodiment, one or more waypoints along route 1204 may be associated with a texture.

In some embodiments, messaging device 1202 may comprise more than one actuator, as described herein in relation to system 500.

Figure 13:
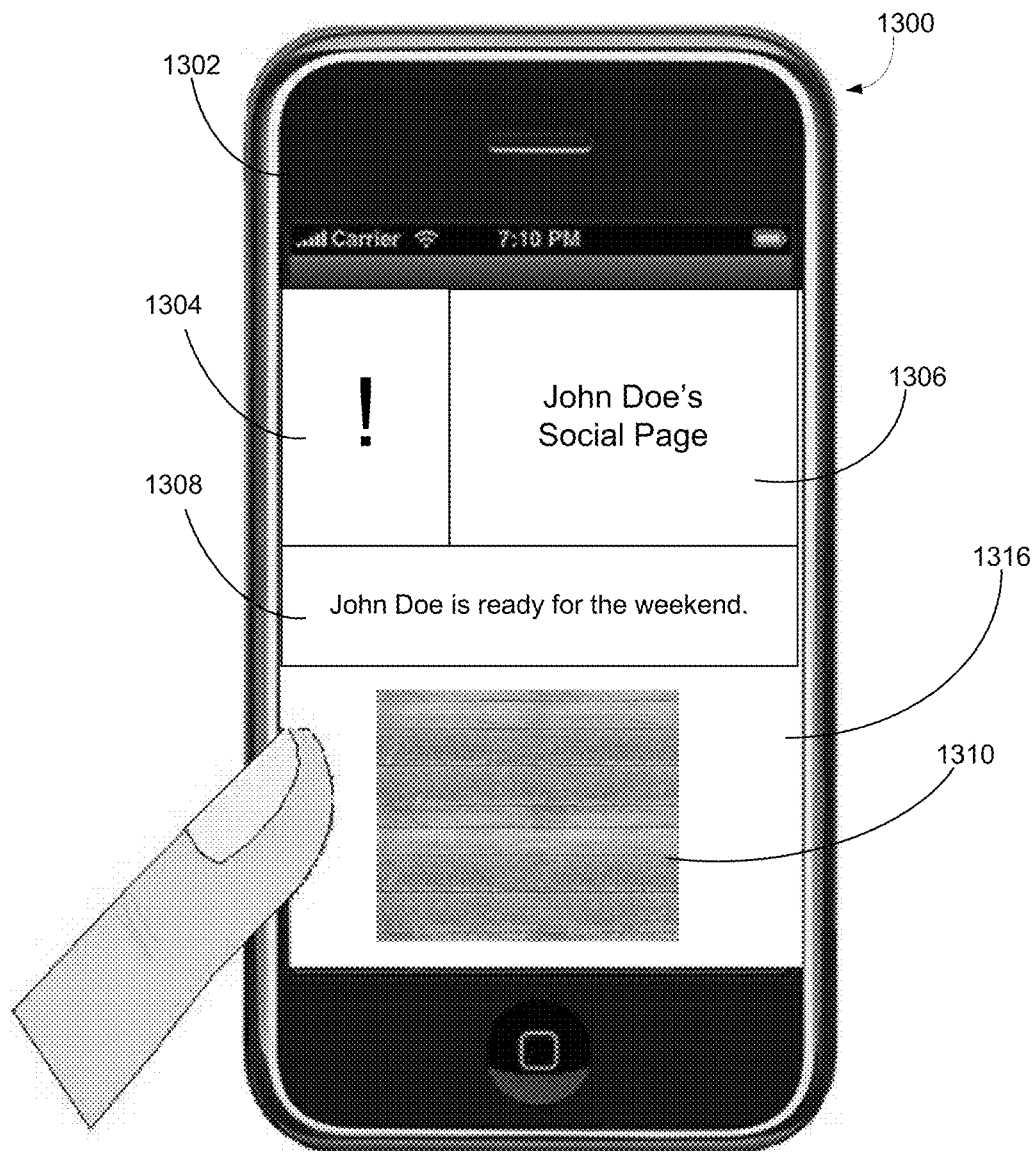
FIG. 13 is another illustration of a system for using textures in graphical user interface widgets according to one embodiment of the present invention.

FIG. 13 is an illustration of a system for using textures in graphical user interface widgets according to one embodiment of the present invention. FIG. 13 comprises a system 1300, which is similar to system 500 above. As shown in FIG. 13, messaging device 1302 comprises a display 1316 positioned underneath a touch-sensitive interface. In some embodiments (not shown in FIG. 13), system 1300 may further comprise a manipulandum, such as a mouse, scroll wheel, or roller ball, which allows the user to interact with the graphical user interface on display 1316.

As shown in FIG. 13, display 1316 comprises a page for a social networking application. Display 1316 further comprises picture box 1304, name box 1306, status box 1308, and texture 1310. Picture box 1304 is configured to allow the user to post a picture on his/her social networking page. In the embodiment shown in FIG. 13, the user has either not posted picture, or protected the social page such that users not in the user's network cannot access picture box 1304. Name box 1306 is configured to allow the users to post their name, or some other identifying characteristic. In the embodiment shown in FIG. 13, name box 1306 comprises the text "John Doe's Social Page." In other embodiments, the user could post additional information, for example, political affiliation, contact information, gender, or relationship status. Status box 1308 is configured to allow the user or the user's friends to post status updates to the user's social networking page. In some embodiments these updates may comprise textual updates, image updates, video updates, or texture updates. In the embodiment shown in FIG. 13, status update box 1308 comprises two updates. First it comprises the textual update "John Doe is ready for the weekend." Second it comprises texture update 1310.

Messaging device 1302 further comprises an actuator (not shown in FIG. 13) configured to output a haptic effect configured to simulate a texture. In some embodiments, the user can feel this texture on the surface of display 1316. For example, in the embodiment shown in FIG. 13, texture update 1310 comprises the texture of wooden boards. When the user, or a visitor to the user's social networking page touches texture update 1310, messaging device 1302 will output a haptic effect configured to simulate the texture of wooden boards. In other embodiments, the texture update 1310 may comprise a different texture, for example, the texture of oil, sand, water, grass, fur, skin, lizard skin, leather, sandpaper, bricks, or rocks. In some embodiments, users may post textures associated with their current mood to their own social networking page. In other embodiments, users may post textures to friends' pages as gifts or messages to their friends. In still other embodiments, users may associate textures with other portions of social networking pages. For example, in some embodiments, users may post textures to pictures, messages, status, or some other section of social networking pages.

In some embodiments, messaging device 1302 may comprise more than one actuator, as described herein in relation to system 500.

Advantages of Systems and Methods for Using Textures in Graphical User Interface Widgets There are many advantages of systems and methods for using textures in graphical user interface widgets. For example, systems and methods for using textures in graphical user interface widgets adds a previously unused haptic effect to a mobile device. This new effect provides a new avenue for the user to receive information from the device, without the user having to look at the device's display. For example, systems and methods for using textures in graphical user interface widgets may allow the user to assign different textures to different icons, buttons, or other components of their display. Thus, users may be able to determine which icon they are touching, without having to look at that icon. This may increase usability of the device, and may make a device more useful to the visually impaired. It may also increase the adoption of different types of applications that had not previously been utilized by users that often use mobile devices in distracting situations, such as while walking or driving.

Further, systems and methods for using textures in graphical user interface widgets may provide the user with more information, without distracting the user from other tasks. Therefore, it may reduce the likelihood of user error. For example, users will be less likely to hit the wrong icon or press the wrong key if they are utilizing systems and methods for using textures in graphical user interface widgets. This functionality may serve both to increase user satisfaction and increase the adoption rate for technology that incorporates systems and methods for using textures in graphical user interface widgets.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A system comprising:
    a first actuator and a second actuator, each configured to receive a haptic signal and output a haptic effect based at least in part on the haptic signal, the haptic effect configured to simulate a texture;
    a touch-sensitive interface configured to detect a user interaction and output an interface signal; and
    a processor in communication with the actuator and the touch-sensitive interface, the processor configured to:
        receive the interface signal;
        receive a display signal comprising a plurality of pixels defining a display area, wherein each of the plurality of pixels is associated with a color;
        assign a haptic value to each color;
        determine a first texture associated with a first group of pixels defining a first section of the display area, wherein determining the first texture comprises determining the haptic value associated with one or more of the first group of pixels;

determine a second texture associated with a second group of pixels defining a second section of the display area, wherein determining the second texture comprises determining the haptic value associated with one or more of the second group of pixels;

determine a selected actuator by selecting the first actuator if the haptic value is less than a threshold or selecting the second actuator if the haptic value is greater than or equal to the threshold; and transmit a haptic signal configured to cause the selected actuator to:
output a first haptic effect configured to simulate the first texture if the user interaction is associated with the first section of the display area, and
output a second haptic effect configured to simulate the second texture if the user interaction is associated with the second section of the display area.

2. The system of claim 1, wherein first texture and the second texture are each based at least in part on the display signal.

3. The system of claim 1, wherein the texture is a vibrotactile effect.

4. The system of claim 1, wherein the texture comprises the texture of: sand, grass, bricks, rocks, skin, fabric, or fur.

5. The system of claim 1, wherein the selected actuator comprises: a linear resonant actuator, an eccentric rotating mass actuator, a shape memory alloy, an electroactive polymer, a composite piezoelectric actuator, or a piezoelectric actuator.

6. The system of claim 1, wherein the first section of the display area comprises a boundary, and the second section of the display area comprises the pixels that do not comprise the boundary.

7. The system of claim 1, wherein the first section of the display area comprises a route and the second section of the display area comprises a Global Positioning System Interface.

8. The system of claim 1, wherein the first section of the display area comprises a destination and the second section of the display area comprises a Global Positioning System Interface.

9. The system of claim 1, wherein the first section of the display area comprises a location on a social networking page and the second section of the display area comprises the remainder of the social networking page.

10. The system of claim 1, wherein first section of the display area comprises a scrollbar and the second section of the display area comprises pixels that do not comprise the scrollbar.

11. The system of claim 10, wherein the processor is configured to determine a different texture in the first section of the display area as the scrollbar moves.

12. The system of claim 1, wherein the first section of the display area comprises text and the second section of the display area comprises the remainder of the display area.

13. The system of claim 1, wherein the first section of the display area comprises a section of the display area determined based at least in part on the interface signal, and the second section of the display area comprises the remainder of the display area.

14. The system of claim 1, wherein the first section of the display area comprises an icon and the second section of the display area comprises the remainder of the display area.

15. The system of claim 14, wherein the icon comprises a drawing tool.

16. The system of claim 14, wherein the icon comprises a folder.

17. The system of claim 16, wherein the first texture is determined based at least in part on the contents of the folder.

18. The system of claim 1, further comprising a display in communication with the processor, the display configured to receive the display signal and output an image based at least in part on the display signal.

19. The system of claim 18, wherein the first texture and the second texture are output on a surface of the display.

20. A method for outputting textures comprising:
receiving a display signal comprising a plurality of pixels defining a display area, wherein each of the plurality of pixels is associated with a color;
assigning a haptic value to each color;
receiving an interface signal from a touch-sensitive interface configured to detect a user interaction and output an interface signal;
determining a first texture associated with a first group of pixels defining a first section of the display area, wherein determining the first texture comprises determining the haptic value associated with one or more of the first group of pixels;
determining a second texture associated with a second group of pixels defining a second section of the display area, wherein determining the second texture comprises determining the haptic value associated with one or more of the second group of pixels; and
determine a selected actuator by selecting a first actuator if the haptic value is less than a threshold or selecting a second actuator if the haptic value is greater than or equal to the threshold; and
transmitting a haptic signal to the selected actuator configured to receive the haptic signal and output a haptic effect, the haptic signal configured to cause the selected actuator to:
output a first haptic effect configured to simulate the first texture if the user interaction is associated with the first section of the display area, and
output a second haptic effect configured to simulate the second texture if the user interaction is associated with the second section of the display area.

21. The method of claim 20, further comprising receiving the display signal and outputting an image based at least in part on the display signal.

22. The method of claim 21, wherein the first haptic effect and the second haptic effect are output on a surface of the display.

23. A system comprising:
a first actuator and a second actuator, each configured to receive a haptic signal and output a haptic effect configured to simulate a texture based at least in part on the haptic signal;
a touch-sensitive interface configured to detect a user interaction and output an interface signal associated with the user interaction;
a processor in communication with the actuator and the touch-sensitive interface, the processor configured to:
receive the interface signal;
receive a display signal comprising a plurality of pixels defining a display area, wherein each of the plurality of pixels is associated with a color;
assign a haptic value to each color;

determine a first texture based at least in part on the display signal and the interface signal, the first texture associated with a first group of pixels defining a first section of the display area, wherein determining the first texture comprises determining the haptic value associated with one or more of the first group of pixels;

determine a second texture based at least in part on the display signal and the interface signal, the second texture associated with a second group of pixels defining a second section of the display area, wherein determining the second texture comprises determining the haptic value associated with one or more of the second group of pixels; and determine a selected actuator by selecting the first actuator if the haptic value is less than a threshold or selecting the second actuator if the haptic value is greater than or equal to the threshold; and transmit a haptic signal configured to cause the selected actuator to:

output a first haptic effect configured to simulate the first texture if the user interaction is associated with the first section of the display area, and output a second haptic effect configured to simulate the second texture if the user interaction is associated with the second section of the display area; and a display configured to receive the display signal and output an image based at least in part on the display signal, and wherein the first haptic effect and the second haptic effect are output on a surface of the display.

* * * * *